(12) United States Patent
Clothier et al.

(10) Patent No.: US 7,227,108 B2
(45) Date of Patent: Jun. 5, 2007

(54) DISPENSER ASSEMBLIES AND SYSTEMS INCLUDING A HEAT STORAGE UNIT

(75) Inventors: Brian L. Clothier, Wichita, KS (US); Stephen B. Leonard, Franksville, WI (US); David P. Mather, Milwaukee, WI (US); Amil J. Ablah, Wichita, KS (US)

(73) Assignee: S.C. Johnson & Son, Inc., Racine, WI (US)

( * ) Notice: Subject to any disclaimer, the term of this patent is extended or adjusted under 35 U.S.C. 154(b) by 0 days.

(21) Appl. No.: 10/875,169

(22) Filed: Jun. 25, 2004

(65) Prior Publication Data

US 2005/0011883 A1     Jan. 20, 2005

Related U.S. Application Data

(60) Provisional application No. 60/482,867, filed on Jun. 27, 2003.

(51) Int. Cl.
    *H05B 6/64*     (2006.01)
(52) U.S. Cl. .................................. 219/618; 219/759
(58) Field of Classification Search ............... 219/618, 219/619, 628–630, 635, 759, 214, 621; 392/390, 392/392, 395, 397, 398, 341, 342, 346
    See application file for complete search history.

(56) References Cited

U.S. PATENT DOCUMENTS

| 3,144,174 A | 8/1964 | Abplanalp ................. 222/146 |
| 3,518,410 A | 6/1970 | Dillarstone ................. 219/300 |
| 3,578,945 A | 5/1971 | Mountainside ............... 219/214 |
| 3,644,707 A | 2/1972 | Costello ..................... 219/302 |
| 3,777,117 A * | 12/1973 | Othmer ....................... 392/469 |
| 3,824,364 A | 7/1974 | Cachat ....................... 219/10.51 |
| 3,997,083 A | 12/1976 | McNair ................ 222/146 HA |
| 4,067,480 A | 1/1978 | Gasser ........................ 222/146 |
| 4,499,355 A | 2/1985 | Walter ................... 219/10.49 R |
| 4,803,341 A | 2/1989 | Barowski et al. ........... 219/222 |
| 4,983,798 A | 1/1991 | Eckler et al. ......... 219/10.55 M |
| 5,603,858 A | 2/1997 | Wyatt et al. ................ 219/620 |
| 5,954,984 A | 9/1999 | Ablah et al. ................ 219/621 |
| 6,005,233 A | 12/1999 | Wyatt ......................... 219/621 |
| 6,112,580 A * | 9/2000 | Hesky ......................... 73/49.1 |
| 6,191,401 B1 | 2/2001 | Salerno et al. .............. 219/621 |

(Continued)

FOREIGN PATENT DOCUMENTS

DE        787125      12/1957
WO     WO94/19917    9/1994

OTHER PUBLICATIONS

Richard J. Babyak, "Automatic Cooktop", Appliance Manufacturer, Feb. 2002.

*Primary Examiner*—Quang Van

(57) ABSTRACT

A heat storage unit (2) includes a body having a passage (12) formed therein through which a flowable product passes. A heatable element (10) is incorporated within the body of the heat storage unit (2) in thermal communication with the passage (12). Meanwhile, a heat-retentive material (8) is in thermal communication with the heatable element (10). The heatable element (10) includes either a magnetically-compatible material or a microwave-compatible material that is heated by locating the heatable element in a field (F) generated by a charging device (6), for example.

89 Claims, 14 Drawing Sheets

U.S. PATENT DOCUMENTS

| | | | |
|---|---|---|---|
| 6,230,936 B1 | 5/2001 | Lasko | 222/146.5 |
| 6,232,585 B1 | 5/2001 | Clothier et al. | 219/620 |
| 6,274,856 B1 | 8/2001 | Clothier et al. | 219/627 |
| 6,278,095 B1 * | 8/2001 | Bass et al. | 219/629 |
| 6,316,753 B2 | 11/2001 | Clothier et al. | 219/621 |
| 6,320,169 B1 | 11/2001 | Clothier | 219/626 |
| 6,350,972 B1 | 2/2002 | Wright et al. | 219/621 |
| 6,415,957 B1 | 7/2002 | Michaels et al. | 222/146.3 |
| 6,444,961 B2 | 9/2002 | Clothier et al. | 219/622 |
| 6,454,127 B1 | 9/2002 | Suomela et al. | 222/54 |
| 6,657,170 B2 | 12/2003 | Clothier | 219/622 |
| 6,664,520 B2 | 12/2003 | Clothier | 219/634 |
| 2004/0124988 A1 | 7/2004 | Leonard et al. | 340/612 |

* cited by examiner

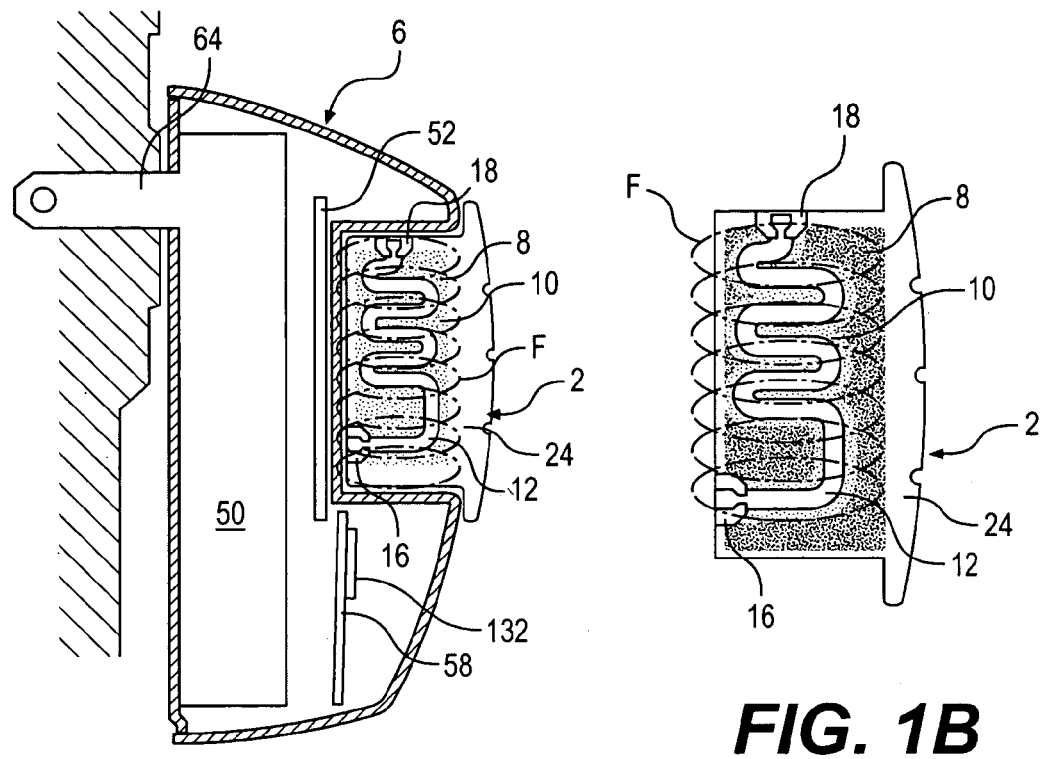
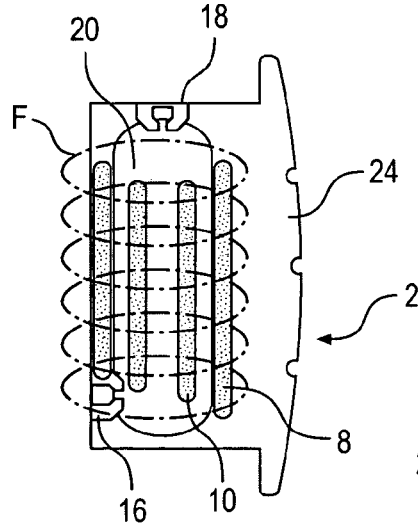
FIG. 1C
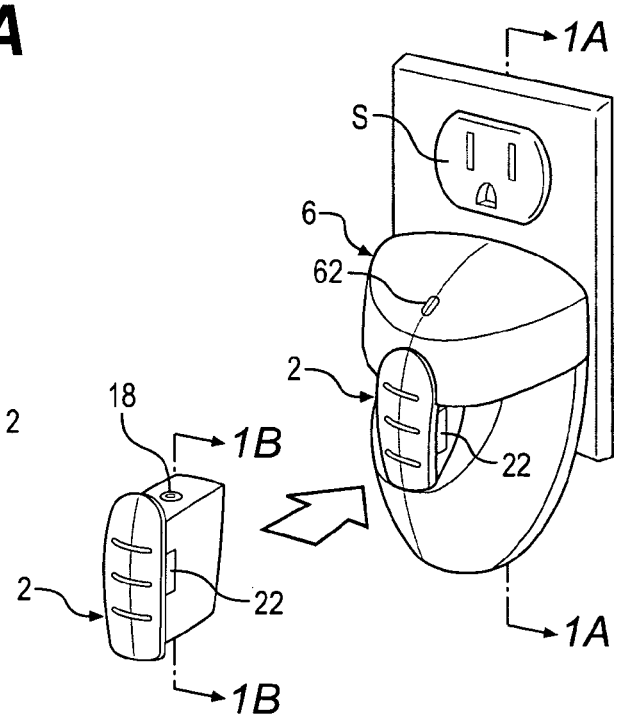

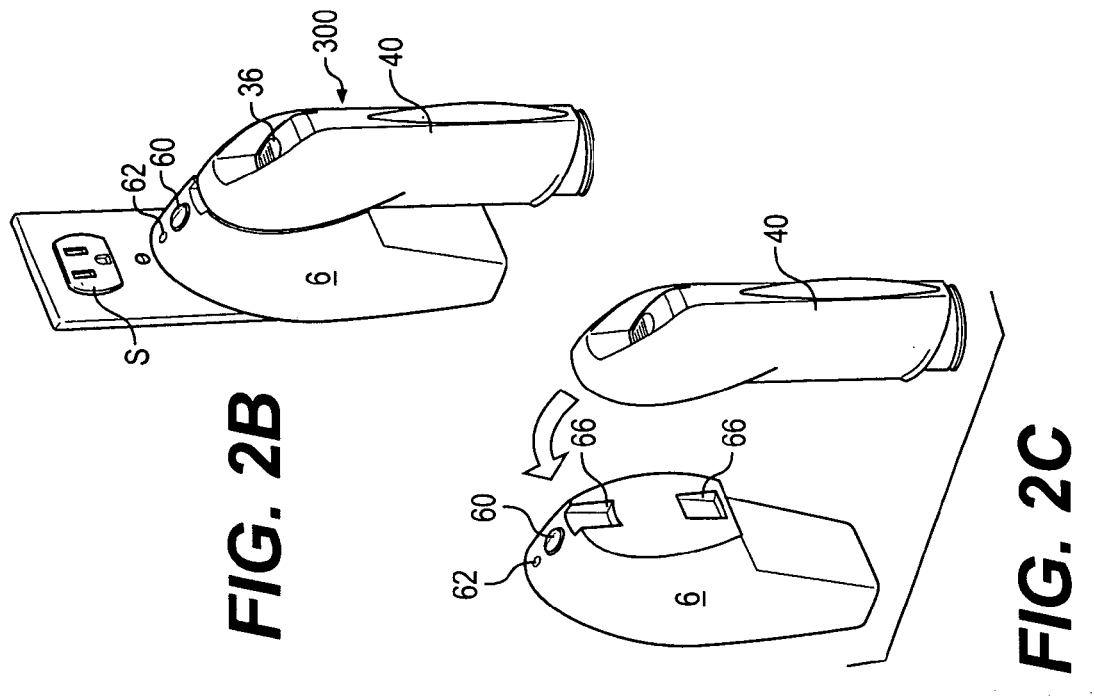
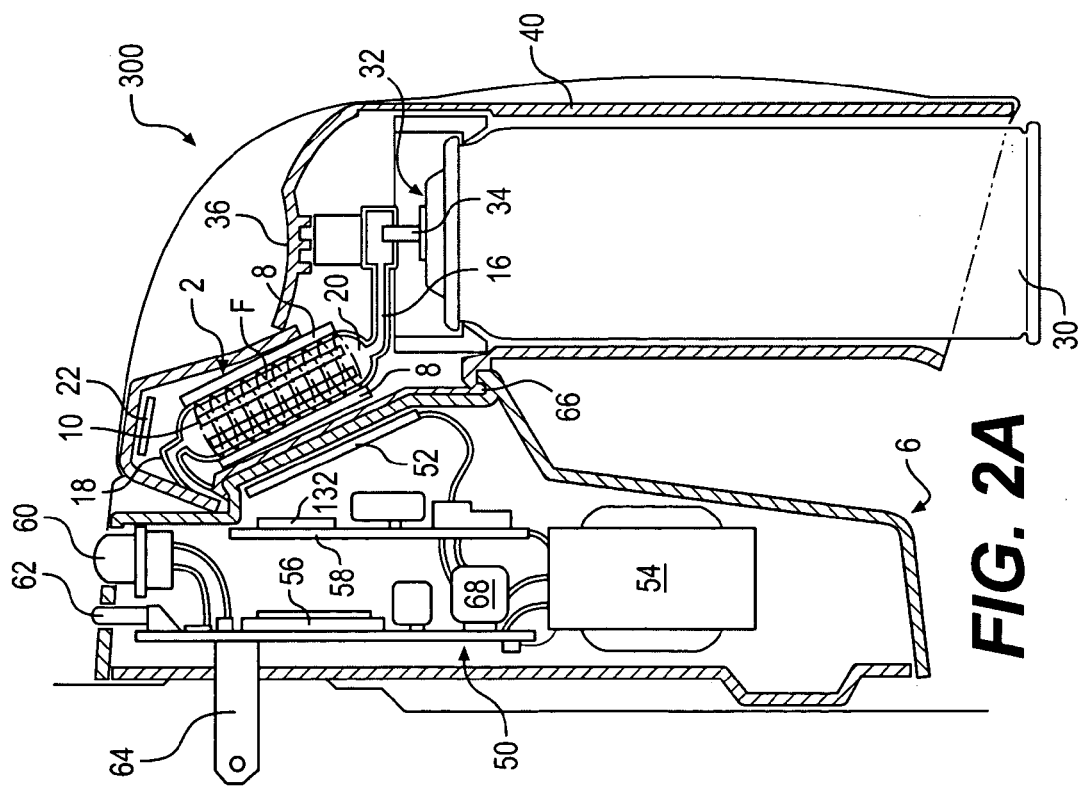

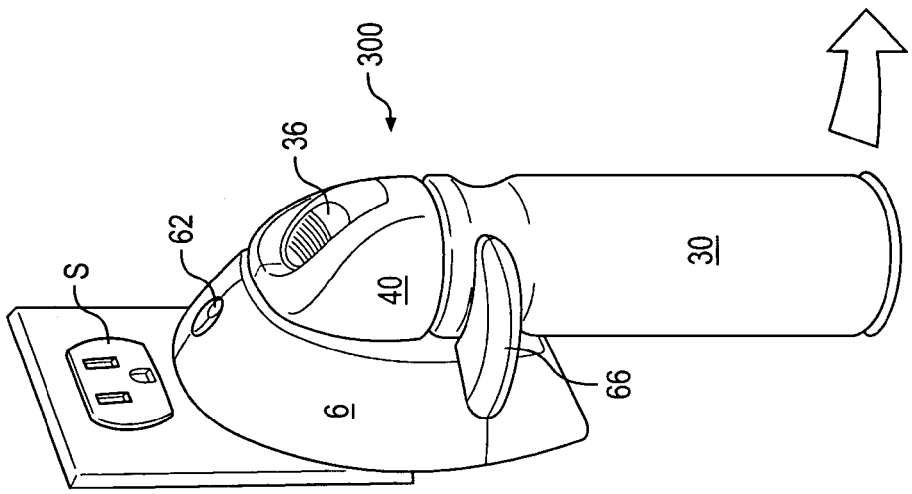
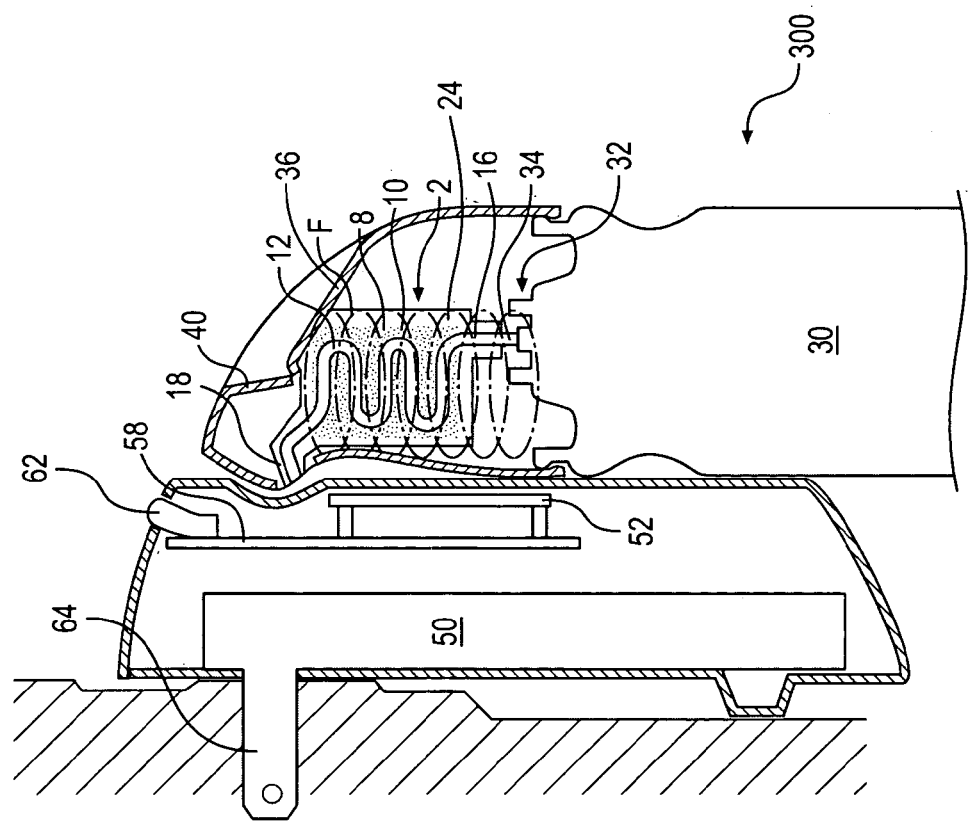

DISPENSER ASSEMBLIES AND SYSTEMS INCLUDING A HEAT STORAGE UNIT

RELATED APPLICATION

This application claims the benefit of U.S. Provisional Patent Application No. 60/482,867, filed Jun. 27, 2003.

FIELD OF THE INVENTION

Our invention relates to a heat storage unit for a flowable product and to dispenser assemblies and systems utilizing such a heat storage unit. The heat storage unit is heatable by either induction heating or microwave heating. Our invention also relates to a method of manufacturing a heat storage unit.

BACKGROUND OF THE INVENTION

Dispenser assemblies for dispensing a heated product are known in the art. Conventional dispenser assemblies typically include a container for holding a flowable product, a mechanism to expel the product from the container, and, in some instances, an electrical heating element for heating the product prior to being dispensed. For example, each of U.S. Pat. No. 3,144,174 to Abplanalp and U.S. Pat. No. 3,644,707 to Costello discloses an aerosol dispenser assembly having a heating element for heating a flowable product, such as shaving cream, prior to dispensing. In each of these patents, the heating element is disclosed as being an electrical resistance heating element. However, the Abplanalp patent also suggests that the dispenser assembly may use heating elements having "other conventional forms," including an "induction type" heating element.

The Costello patent further discloses that a heat storage medium, such as water, alcohol, powdered metal, or the like, may be used to absorb and retain heat generated by an electric resistance heating coil. According to the Costello patent, the heat-retaining medium stores heat for only a few minutes so that after the dispenser assembly is unplugged from a wall socket, warm shaving cream is still available for a single shave.

SUMMARY OF THE INVENTION

Our invention provides an improved heat storage unit and a method of manufacturing the same, a dispenser assembly, and a system for heating a flowable product, which is easy to use, fast, safe, and is capable of heating a flowable product during extended periods of use.

In one aspect, our invention relates to a heat storage unit for heating a flowable product. The heat storage unit comprises a body having a passage formed therein through which a flowable product passes, a heatable element, and a heat-retentive material. The heatable element is incorporated within the body in thermal communication with the passage, and comprises either a magnetically-compatible material or a microwave-compatible material. The heat-retentive material is in thermal communication with the heatable element, and comprises a solid-to-solid phase change material.

Preferably, the heatable element comprises a magnetically-compatible material that is heatable by locating the heatable element in a magnetic field. The heatable element may comprise a ferromagnetic material, such as stainless steel or a temperature sensitive alloy, or a graphite-based material, such as a flexible graphite-based sheeting material or a rigid graphite-filled polymer. The heat storage unit may also include a radio frequency identification tag that stores information about the heat storage unit or about a flowable product used therewith. The heat storage unit can be configured as a cartridge that is detachably securable to a variety of different flowable product dispensers, as an overcap for an aerosol container, or as a porous pad.

Alternatively, instead of a magnetically-compatible material, the heatable element may comprise a microwave-compatible material that is heatable by exposing the heat storage unit to microwave radiation.

In another aspect, our invention relates to a heat storage unit for heating a flowable product that includes a body having a passage formed therein through which a flowable product passes, a heatable element, and a heat-retentive material. The heatable element is incorporated within the body in thermal communication with the passage, and comprises either a magnetically-compatible material or a microwave-compatible material. The heat-retentive material lines at least a portion of the passage and is in thermal communication with the heatable element. The heatable element is heated by locating the heatable element in a field generated external to the heat storage unit. The heat storage unit does not include any components for generating a field to heat the heatable element, and, preferably, is cordless.

In still another aspect, our invention relates to a pad for heating and dispensing a flowable product. The pad includes a porous body and a burstable pouch. The porous body comprises a heat-retentive material and either a magnetically-compatible material or a microwave-compatible material. The burstable pouch contains the flowable product, and is incorporated within the porous body in thermal communication with the magnetically-compatible material or the microwave-compatible material. The flowable product is dispensed from the porous body by compressing the burstable pouch.

In yet another aspect, our invention relates to a system that includes a heat storage unit and a charging device. The heat storage unit comprises a body having a passage formed therein, a heatable element incorporated within the body in thermal communication with the passage, and a heat-retentive material in thermal communication with the heatable element. The heatable element comprises either a magnetically-compatible material or a microwave-compatible material. The heat storage unit is detachably docked with the charging device, such that when the charging device is activated, a field is generated that encompasses the heatable element of the heat storage unit, thereby raising the temperature of the heatable element.

In another aspect, our invention relates to a method of manufacturing a heat storage unit. The method comprises the steps of molding a heat-retentive body, molding a heatable element of either a magnetically-compatible material or a microwave-compatible material in thermal contact with the heat-retentive body, and forming a passage through the heat storage unit, the passage defining a flow path for a flowable product. An insulating layer can be over-molded at least partially about the outside of the heat storage unit. A radio frequency identification device can be attached to the heat storage unit to store information about the heat storage unit.

BRIEF DESCRIPTION OF THE DRAWINGS

FIG. 1A is a simplified cross-sectional view of a system according to a first embodiment of our invention taken along line 1A—1A shown in FIG. 1D, including a heat storage unit and a wall-mounted charging device. Hatching of the heat storage unit has been omitted for clarity throughout the drawing figures.

FIGS. 1B and 1C are simplified cross-sectional views showing alternative configurations of the heat storage unit of the first embodiment of our invention, taken along line 1B—1B shown in FIG. 1D.

FIG. 1D is a perspective view showing the relationship of the heat storage unit to the charging device in the system of FIG. 1A.

FIG. 2A is a cross-sectional view of a hot-shave dispenser assembly employing a heat storage unit according to a second embodiment, attached to a wall-mounted charging device.

FIG. 2B is a perspective view of the hot-shave dispenser assembly of FIG. 2A, attached to a wall-mounted charging device.

FIG. 2C is a perspective view showing how, in one example, the dispenser assembly of FIG. 2A attaches to the charging device.

FIG. 3A is a cross-sectional view of a hot-shave dispenser assembly employing a heat storage unit according to a third embodiment, attached to a wall-mounted charging device.

FIG. 3B is a perspective view of the hot-shave dispenser assembly of FIG. 3A, attached to a wall-mounted charging device.

Throughout the drawing figures, like or corresponding reference numerals denote like or corresponding elements.

DETAILED DESCRIPTION OF THE PREFERRED EMBODIMENTS

Figure 1F:
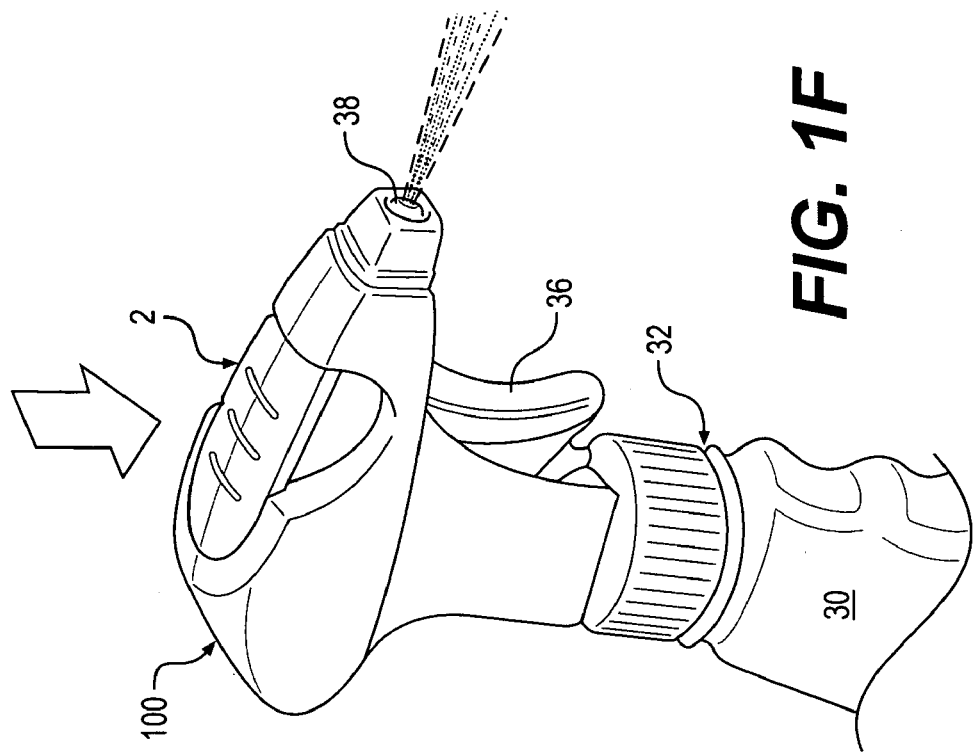
FIGS. 1E and 1F are perspective views showing various dispenser assemblies employing a heat storage unit according to the first embodiment.

Our invention relates generally to a heat storage unit, a dispenser assembly, and a system for heating a flowable product, such as a cleaning solution, an air freshener, a shaving gel or cream, a lotion, an insecticide, or the like.

More specifically, the system of our invention includes a heat storage unit 2 that is capable of being used either as part of a dispenser assembly or alone, and a charging device 6 for charging, or energizing, the heat storage unit. The terms "charging" and "energizing" are used interchangeably herein to mean to impart energy to the heat storage unit by, among other ways, exposing the heat storage unit to a magnetic field or to microwave radiation. The heat storage unit 2 serves to impart heat to a flowable product prior to the flowable product being dispensed.

The heat storage unit 2 comprises a heat-retentive material 8 and a heatable element 10 arranged in thermal communication with each other. A passage 12 is formed in the body of the heat storage unit 2 and defines a flow path through which the flowable product passes during dispensing. The heat storage unit 2 also may optionally include an insulating shell layer 24 that covers at least a portion of the surface of the heat storage unit 2. When the heat storage unit 2 is docked with the charging device 6 and the charging device is activated, the heat storage unit 2 develops and stores heat, thereby becoming charged. The heat storage unit 2, thus charged, gradually meters out heat to the flowable product in the passage 12, so as to provide heat over an extended period of time.

The heatable element 10 preferably comprises a magnetically-compatible material ("MCM"). As used herein, the term "magnetically-compatible material" means a material that is capable of being heated by exposure to an alternating magnetic field, specific examples of which are discussed in more detail below. Preferably, the heatable element 10 comprises a ferromagnetic metal or alloy, such as, for example, stainless steel or a temperature sensitive alloy ("TSA"). TSAs lose their magnetic properties when heated above a specific temperature, thereby providing a built-in safety mechanism to prevent overheating. U.S. Pat. No. 6,232,585, which is incorporated by reference herein, discloses examples of ferromagnetic materials suitable for use as the heatable element 10.

Alternatively, the heatable element 10 could comprise a graphite-based material, such as GRAFOIL® or EGRAF™ sheeting, which are flexible graphite sheeting materials available from Graftech Inc. of Lakewood, Ohio (a division of UCAR Carbon Technology Corporation). Another preferred graphite-based material is a rigid graphite-filled polymer material available under the designation BMC 940 from Bulk Molding Compounds, Inc. of West Chicago, Ill. Still other rigid, graphite-based materials having smaller amounts of polymer filler than the BMC 940 may also be used. These graphite-based materials are discussed in U.S. Pat. Nos. 6,657,170 and 6,664,520, the disclosure of each of which is incorporated by reference herein.

GRAFOIL® and EGRAF™ sheeting are graphite sheet products made by taking high quality particulate graphite flake and processing it through an intercalculation process using strong mineral acids. The flake is then heated to volatilize the acids and expands to many times its original size. No binders are introduced into the manufacturing process. The result is a sheet material that typically exceeds 98% carbon by weight. The materials are flexible, lightweight, compressible, resilient, chemically inert, fire safe, and stable under load and temperature.

GRAFOIL® or EGRAF™ sheeting are significantly more electrically and thermally conductive in the plane of the sheet than in a direction through the plane. It has been found experimentally that this anisotropy has two benefits. First, the higher electrical resistance in the through-plane direction allows the material to have an impedance at 20–50 kHz that allows a magnetic induction heater operating at such frequencies to efficiently heat the material while the superior thermal conductivity in the plane of the sheet enables the sheet to be quickly and uniformly heated across its entire width. Second, successive layers of GRAFOIL® or EGRAF™ sheeting can be inductively heated simultaneously, even if each layer is electrically insulated from the next. For example, each layer of GRAFOIL® sheeting in a laminated structure comprising several layers of GRAFOIL® sheeting sandwiched between layers of an insulative or heat-retentive material can be inductively heated at approximately equal heating rates.

The BMC 940 rigid graphite-filled polymer material also has advantages for use as the heatable element 10 of our invention. Its ability to be injection or compression molded into complex shapes allows it to be easily formed into any desired shape or size.

Alternatively, instead of MCMs, the heatable element 10 could comprise a microwave-compatible material ("MiCM"). The term "microwave-compatible material" is used herein to refer to any dielectric insulator that absorbs energy when exposed to microwave radiation (i.e., electromagnetic radiation having a frequency in the range of about 300 Megahertz to about 300 Gigahertz), thereby causing a heating effect within the MiCM.

Preferably, the heat-retentive material 8 comprises a solid-to-solid phase change material. Solid-to-solid phase change materials reversibly store large amounts of latent heat per unit mass through solid-to-solid, crystalline phase transformations at unique constant transformation temperatures that are well below their respective melting points. The transformation temperature can be adjusted over a wide range of temperatures, from about 25° C. to about 188° C., by combining different solid-to-solid phase change materials. U.S. Pat. Nos. 6,316,753 and 5,954,984, which are incorporated by reference herein, each contains a discussion of solid-to-solid phase change materials suitable for use in our invention.

The solid-to-solid phase change material preferably contains at least a polyethylene resin, and may also include structural additives, thermal conductivity additives, antioxidants, and the like. Preferably, at least about 70% by weight of the heat-retentive material is a polyethylene resin, such as a low density polyethylene resin or a linear low density polyethylene resin. Examples of preferred resins for use in our invention include: a linear low density polyethylene resin designated as GA 564 from Equistar Chemicals, LP of Houston, Tex.; a metallocine linear low density resin designated as mPact D139 from Phillips Petroleum Company of Houston, Tex.; and a low density polyethylene resin designated as LDPE 6401 from Dow Plastics of Midland, Mich. Other polyethylene resins of varying densities can also be used in our invention.

One or more antioxidants may be added to the polyethylene resin, by compounding or the like, in order to deter deterioration of the heat-retentive material during its life of periodic exposure to temperatures above its crystalline melting temperature. Examples of preferred antioxidants include: IRGANOX® 1010 or IRGANOX® 1330 produced by Ciba Specialty Chemicals of Switzerland; UVASIL® 2000 LM produced by Great Lakes Chemical Corporation of West Lafayette, Ind.; ULTRANOX® 641 and WESTON™ 618 produced by GE Specialty Chemicals of Parkersburg, W.Va.; and DOVERPHOS® S-9228 produced by Dover Chemical Corp. of Dover, Ohio. Preferably, the antioxidant(s) comprise no more than about 1.0% by weight of the heat-retentive material.

Structural and/or thermal conductivity materials, such as, for example, chopped glass fiber, glass particles, carbon powders, carbon fibers, and the like, may also be added to the polyethylene resin in amounts up to about 30% by weight of the heat-retentive material by compounding, or the like. Chopped glass fiber, for example, imparts structural strength to the heat-retentive material when heated above the melting point of the polyethylene resin. A suitable chopped glass fiber is 415A CRATEC® chopped glass strands, available from Owens Corning, which are particularly formulated to optimize glass/polymer adhesion.

Low density polyethylene and linear low density polyethylene resins incorporating carbon powder such as MPC Channel Black produced by Keystone Aniline Corporation of Chicago, Ill., and XPB-090 produced by Degussa Chemicals of Akron, Ohio, exhibit not only improved structural integrity at high temperatures and improved thermal conductivity, but also a reduction in the oxidation rate of the polyethylene.

In summary, a particularly preferred heat-retentive material 8 is a solid-to-solid phase change composite having at least about 70% by weight polyethylene content and from 0% to about 30% by weight of additives such as antioxidants, thermal conductivity additives, structural additives, or the like.

While the use of a solid-to-solid phase change material as the heat-retentive material is preferred for prolonged heating applications, other heat-retentive materials that store and release sensible heat can be used if a shorter heating period is acceptable. Suitable alternative heat-retentive materials include polymers such as thermoplastics, thermoset resins, and elastomers, preferably, polyethylene, polypropylene, or nylon, to name a few examples. Preferably, the heat-retentive material has a specific heat of at least about 0.2 calories per gram-degree Celsius; more preferably, at least about 0.4 calories per gram-degree Celsius; and most preferably, at least about 0.5 calories per gram-degree Celsius. As used, herein, the term "heat-retentive material" means a polymeric material that has a specific heat of at least about 0.2 calories per gram-degree Celsius, preferred examples of which are mentioned above.

The insulating layer 24 provides a surface that will remain cool to the touch, while also limiting the dissipation of heat from the heat storage unit 2 to the ambient surroundings. Preferably, the insulating layer 24 includes an inner layer of insulating material adjacent to an outer shell layer. The inner layer of insulating material is designed to withstand the maximum temperatures of the heat-retentive material 8 and the heatable element 10, while at the same time providing a high insulative value so as to prevent the surface of the adjacent outer shell layer from becoming too hot. Many known fiber, foam, or non-woven insulating materials may be used for this' inner layer. Examples of preferred insulating materials include MANNIGLASS® V1200 and V1900, available from Lydall of Troy, N.Y. Many known types of plastic materials, such as, but not restricted to, polypropylene, polyethylene, various engineered resins, and acrylonitrile butadiene styrene ("ABS"), can be used to construct the outer layer of the insulating shell layer 24.

Next, several preferred embodiments of our invention are described below. It should be understood, however, that various features of each of these embodiments could be added, omitted, and/or combined in different ways depending on the particular features desired.

First Embodiment

A first preferred embodiment of our invention is described below with reference to FIGS. 1A–1F. In this embodiment, the heat storage unit 2 is configured as a removable, cordless cartridge that can be used with each of a plurality of different types of dispenser assemblies. In this embodiment, the heatable element 10 is an MCM.

In operation, the heat storage unit 2 is plugged into a charging device 6. The charging device 6 is then activated to generate a high-frequency alternating magnetic field F, which causes eddy current heating, hysteresis heating, resistive heating, or a combination of these types of heating along the path of the constrained induced current. The heat-retentive material 8 absorbs and retains the heat generated by the heatable element, thereby energizing the heat storage unit 2. Once charged, the heat storage unit 2 can be removed from the charger and installed in any one of a number of different dispensers, such as those shown in FIGS. 1E and 1F. The heat storage unit 2 then dissipates heat stored in the heatable element 10 and the heat-retentive material 8 to the flowable product. Depending on the particular application, the heat storage unit 2 can be configured to retain its charge anywhere from several minutes to several hours. One skilled in the art will readily understand that the heat-retentive ability of the heat storage unit 2 will largely depend on the size and arrangement of the heatable element 10, the heat-retentive material 8, and the insulating shell 24.

The heat storage unit 2 of the first embodiment may be configured in a variety of different ways, a few of which are illustrated by FIGS. 1A–1C. One of ordinary skill in the art will, of course, recognize that the arrangement and size of the heatable element 10 and the heat-retentive material 8 can be varied depending on the desired heating parameters such as maximum temperature, heat retention time, and energizing time, and the desired flowable product dispensing capabilities such as dispensing rate and quantity.

In a first variation of the first embodiment, shown in FIG. 1A, the heatable element 10 and the heat-retentive material 8 are formed together as a uniform mixture of heatable and heat-retentive material. The exterior of the unitary heatable element 10 and the heat-retentive material 8 mixture is coated with an insulating layer 24. A circuitous passage 12 is formed through the heat storage unit 2 and defines a long flow path for the flowable product during dispensing. An inlet 16 and an outlet 18 are formed at opposite ends of the passage 12. The length of the circuitous passage 12 provides a large interface between the heat storage unit 2 and the flowable product, thereby allowing heat to be rapidly transferred to the flowable product. Preferably, the passage 12 is at least twice as long as any dimension of the heat storage unit 2. Since heat can rapidly be transferred to the flowable product as it flows through the passage 12, the heat storage unit 2 is able to provide "point of use" heating. That is, the heat storage unit 2 of this configuration is able to heat the flowable product at essentially the same rate it is dispensed.

Figure 7:
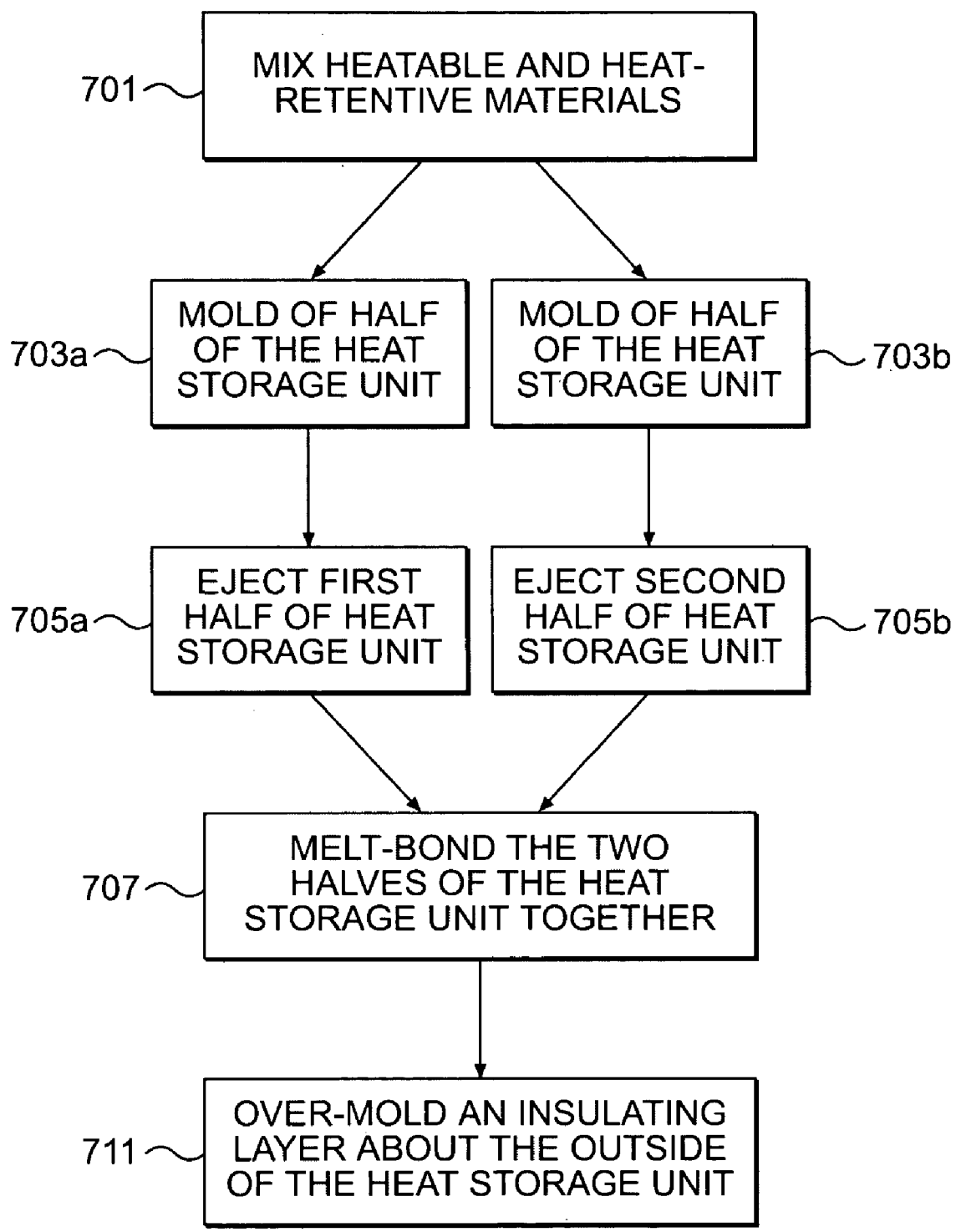
FIG. 7 is a flow chart illustrating a method of manufacturing the heat storage unit of FIG. 1A.

In this arrangement, the heatable material and heat-retentive material are preferably both moldable materials such as, for example, BMC 940 graphite-filled polymer material and solid-to-solid phase change composite material, respectively. A method of manufacturing the heat storage unit 2 of this first variation is described with reference to FIG. 7. First, in step 701, the heatable material and the heat-retentive material are mixed. The mixture of the heatable material and the heat-retentive material may be accomplished by a separate mixing process, or alternatively, the two materials could simply be allowed to mix as they are being injected into the molds. Next, in steps 703a and 703b, the heat storage unit 2 is molded in two separate halves. Each half of the heat storage unit 2 is molded with half of the contour of the circuitous passage 12. The first and second halves of the heat storage unit 2 are then ejected from their respective molds in steps 705a and 705b. The two halves of the heat storage unit 2 are then arranged adjacent one another and melt-bonded together in step 707 with the passage 12 extending therethrough. In step 709, the insulating layer 24 is over-molded about the outside of the heat storage unit 2. While the heat storage unit 2 is described, with reference to FIG. 7, as being formed in two halves and then melt-bonded together, the heat storage unit 2 could alternatively be molded as a single unit. Moreover, the heat storage unit 2 of this variation could be manufactured by injection molding, compression molding, or any other suitable molding technique.

Figure 8:
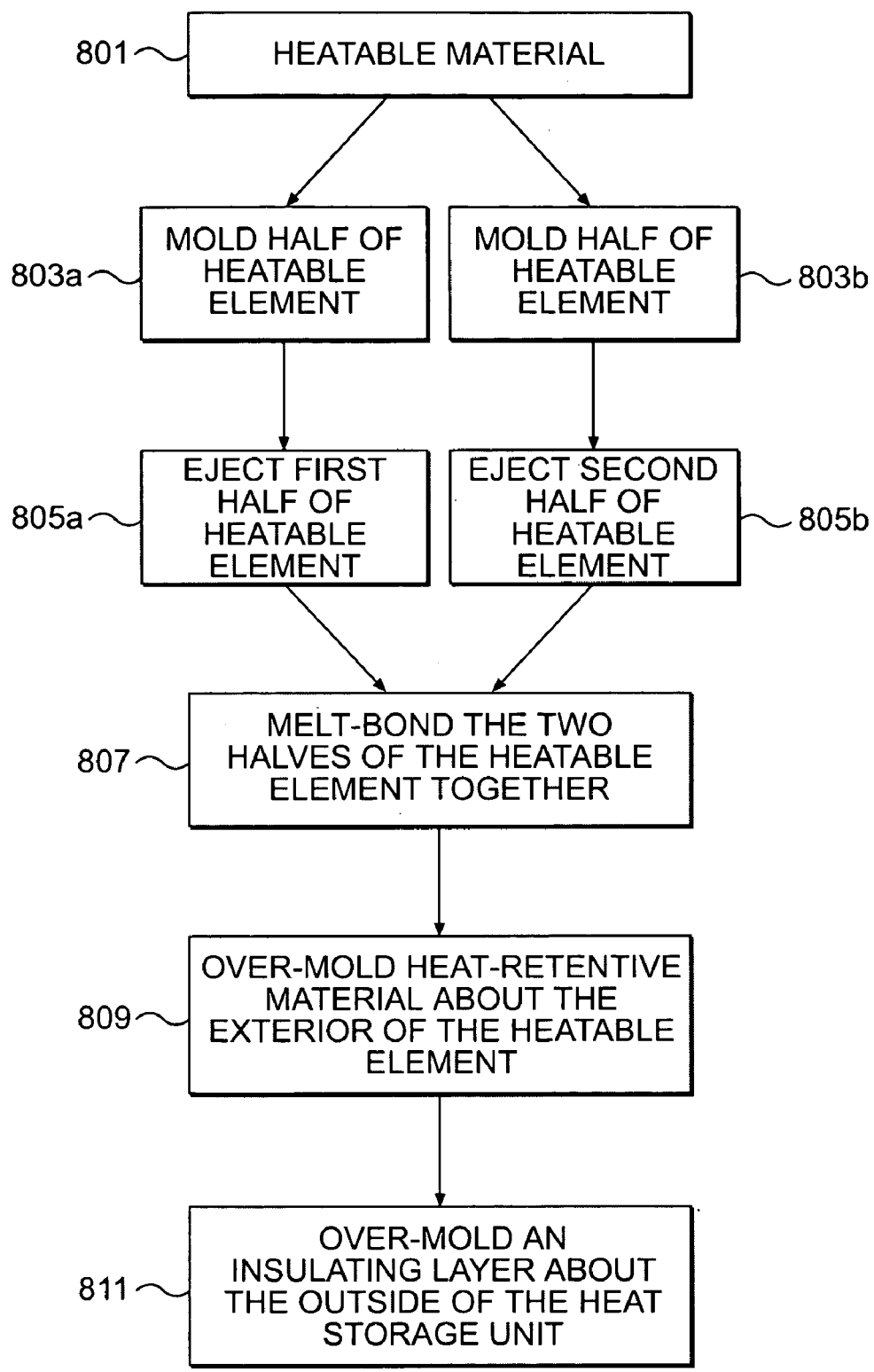
FIG. 8 is a flow chart illustrating a method of manufacturing the heat storage unit of FIG. 1B.

FIG. 1B illustrates a second variation of the first embodiment. In this second variation, the heat storage unit 2 is constructed similarly to the first variation shown in FIG. 1A, except that instead of the heatable element 10 and the heat-retentive material 8 being formed together as a mixture of heatable and heat-retentive materials, these two elements are discretely formed, as described below with reference to FIG. 8. In this variation, heatable material is provided in step 801. In steps 803a and 803b, the heatable element 10 is molded in two separate pieces, each piece defining half of the passage 12. The two halves are then ejected from their respective molds in step 805a and, 805b. In step 807 the two halves of the heatable element 10 are assembled adjacent one another and melt-bonded together to form the heatable element 10 with the passage 12 formed therethrough. The heat-retentive material is then over-molded about the exterior of the heatable element 10 in step 809 to form the heat storage unit 2. The insulating layer 24 is over-molded about the outside of the heat storage unit 2 in step 811. In this variation, the passage 12 is configured as a circuitous passage, substantially the same as that depicted in FIG. 1A and discussed above. The materials used for the heat-retentive material 8 and the heatable element 10 are preferably the same as those discussed above with respect to FIG. 1A.

Figure 9:
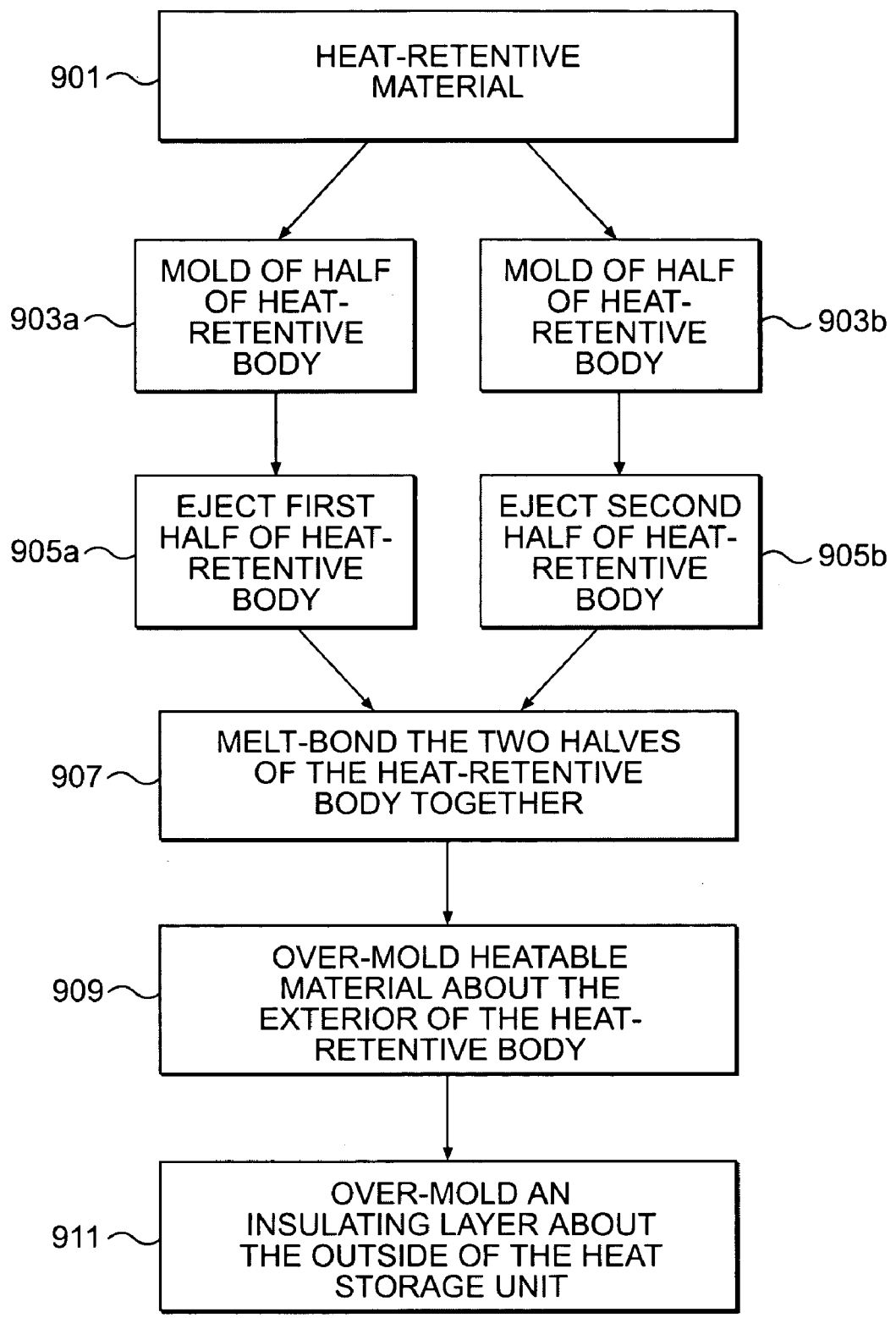
FIG. 9 is a flow chart illustrating an alternative method of manufacturing the heat storage unit of FIG. 1B.

In an alternative construction, the second variation of the first embodiment could be constructed with the heat-retentive material 8 at its interior. The method of manufacturing this particular alternative is described with reference to FIG. 9. In this alternative of the second variation, heat-retentive material is provided in step 901. In steps 903a and 903b, the heat-retentive material 8 is molded in two separate pieces, each piece defining half of the passage 12. The two halves of the heat-retentive material 8 are then ejected from their respective molds in step 905a and 905b. In step 907, the two halves of the heatable element 10 are joined together by, for example, melt-bonding, to form the heat-retentive material 8 with the passage 12 formed therethrough. The heatable material is then over-molded about the exterior of the heat-retentive material 8 in step 909 to form the heat storage unit 2. The insulating layer 24 is over-molded about the outside of the heat storage unit 2 in step 911.

FIG. 1C illustrates a third variation of the first embodiment. In this variation, the heat-retentive material 8 and the heatable element 10 are formed separately. Instead of a long circuitous passage as in the first two variations, the passage 12 in this variation comprises an enlarged reservoir 20 formed in the interior of the heat storage unit 2. The reservoir 20 has an inlet 16 and an outlet 18 positioned at substantially opposite ends of the reservoir 20, and defines a flow path for the flowable product. The reservoir 20 is sized to hold at least one dose, and as many as five doses, of the flowable product. A "dose" of the flowable product, as used herein, is defined as the amount of the product typically dispensed with each actuation of a particular dispenser assembly. (For example, an average dose of shaving cream or gel is between about 5 grams and about 15 grams, while an average dose of liquid cleanser dispensed from a spray bottle dispenser is between about 0.5 grams and about 1.5 grams.) This arrangement, in which only a small amount of the flowable product is heated, is known as "one shot" heating. In other words, a finite number of shots or doses (at least one) of material is heated at a given time. This type of arrangement may be preferable when the flowable product is to be heated to a high temperature, or when the size and cost of the heat storage unit 2 are considerations. Also, applications such as lotion dispensers, spray bottles, and shaving creams or gels, in which only a few doses of product are successively dispensed at one time, are particularly amenable to this type of "one shot" heating.

The heatable element 10 in the third variation comprises a number of strips of GRAFOIL® or EGRAF™ sheeting positioned in the interior of the reservoir 20, such that they will be in direct contact with the flowable product contained therein. As can be seen in FIG. 1C, the heat-retentive material 8 is in thermal communication, but not necessarily direct contact, with the heatable element 10. That is, heat is transferred to the heat-retentive material 8 via conduction through the flowable product. FIG. 1C depicts the heatable element 10 as a pair of parallel strips, however, any number of strips may effectively be used. It should be apparent that the greater the total surface area of the strips (as determined by the size, shape, and number of the strips), the faster the heatable element 10 will be able to heat the flowable product. Thus, the size, shape, and number of strips making up the heatable element 10 in this third variation of the first embodiment can be chosen based on the type of flowable product used and the desired rate of heating. Furthermore, various other arrangements of the heat-retentive material 8 and heatable element 10 are also available, as would be understood by one of ordinary skill in the art. For example, the location of the heatable element 10 and the heat-retentive material 8 could be reversed, the heatable element 10 and the heat-retentive material 8 could be located directly adjacent to one another either inside or outside the reservoir, etc.

Furthermore, one of ordinary skill in the art will recognize that the "point of use" heat storage units 2 shown in FIGS. 1A, 1B, and 3A, could also be effectively used for "one shot" heating by simply reducing the length of the passage 12 formed therein. Since the heat storage unit 2 need not heat the flowable product as fast as it is dispensed in a "one shot" system, the passage need only be long enough to accommodate one dose or shot of the flowable product at a time. In this modified arrangement, the passage 12 would function essentially as a long, narrow version of the reservoir of FIGS. 1C and 2A. By using the shortened passage 12 in this variation, the size of the heat storage unit 2, and consequently the cost, would be advantageously reduced. Conversely, if the surface area of the heatable elements 10 in the "one shot" heat storage units 2 of FIGS. 1C and 2A was increased, it would be possible to achieve a heat transfer rate sufficient for "point of use" heating with this type of arrangement as well. This increase in surface area of the heatable element might be accomplished by, for example, increasing the number of strips, making the strips longer and thinner, and/or making the strips corrugated or accordion-shaped.

As described above, the cartridge heat storage units 2 of the first embodiment can be used with various types of dispenser assemblies. FIG. 1E illustrates a cartridge heat storage unit 2 according to the first embodiment inserted in a hand-held scrub brush dispenser 200. The passage 12 in the heat storage unit 2 forms part of a dispensing path of the flowable product through the scrub brush dispenser. The scrub brush dispenser 200 has a container 30 for housing a flowable product, such as a cleaning solution, and an actuator 36 connected to a pumping device (not shown) for dispensing the flowable product. When a user depresses the actuator 36, the flowable product is pumped from the container 30, through the heat storage unit 2, and out of a dispenser exit opening (not shown) formed in the bottom of the scrub brush dispenser 200. Each single depression of the actuator 36 expels one dose of the heated flowable product.

Figure 1E:
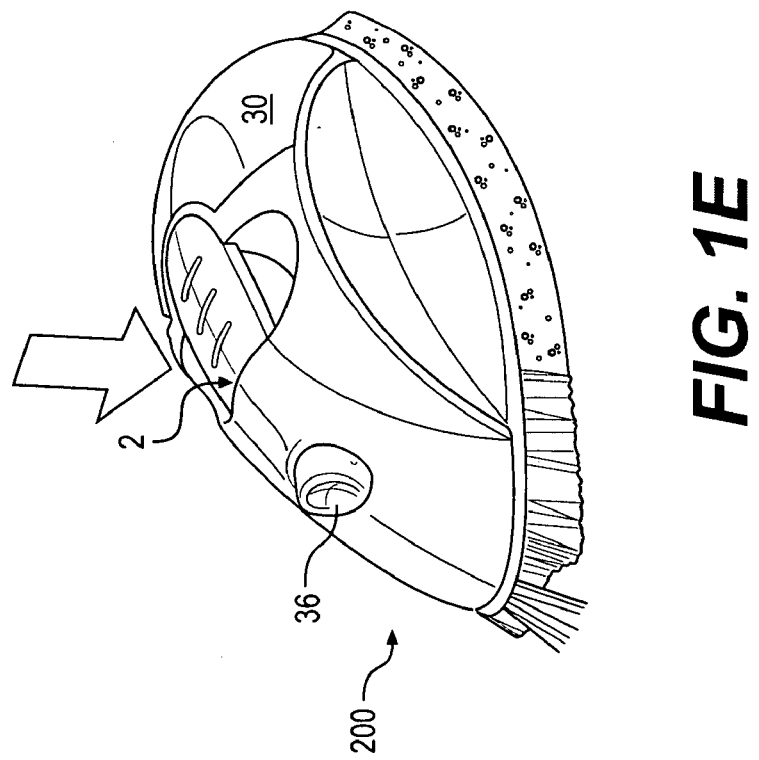

FIG. 1F depicts a cartridge heat storage unit 2 according to the first embodiment inserted in a spray bottle dispenser 100. The spray bottle dispenser 100 functions similarly to the scrub brush dispenser 200 and also includes a container 30 for holding a flowable product, such as a cleaning solution, and an actuator 36 connected to a pumping device (not shown) for dispensing the flowable product. When the actuator 36 of the spray bottle dispenser 100 is pressed, the flowable product is pumped from the container 30, through the heat storage unit 2, and out of a dispenser exit opening 38 as a heated spray. Each single depression of the actuator 36 expels one dose of the heated flowable product.

The charging device 6 of the first embodiment, as best seen in FIG. 1A, generally comprises an electrical plug deck 64, a circuit board 50, a magnetic field generator 52, and a detection device 58.

The plug deck 64 is conventional and serves to both supply power from a standard alternating current (A/C) wall socket S to the other electronics of the charging device 6, and to support the charging device 6 in the wall socket S. Alternatively, the charging device can be equipped with an electrical adapter cord (not shown) for connection to a remote outlet or to a vehicle lighter socket, or the charging device might be configured as a battery-powered portable or table-top unit.

When activated, the field generator 52 generates a high-frequency, alternating magnetic field F that induces an electromotive force ("EMF") in the heatable element 10. In a preferred embodiment, the EMF induced in the heatable element 10 spawns "eddy currents," which cause the element 10 to heat up in direct relation to the power ($I^2R$) of the current through the element 10. It should be understood, however, that the heatable element in other embodiments of our invention can also be designed to experience Joule heating via magnetically induced currents constrained to flow in a wire segment of the heatable element and/or to experience hysteresis heating as a result of its presence in the magnetic field.

Figure 6:
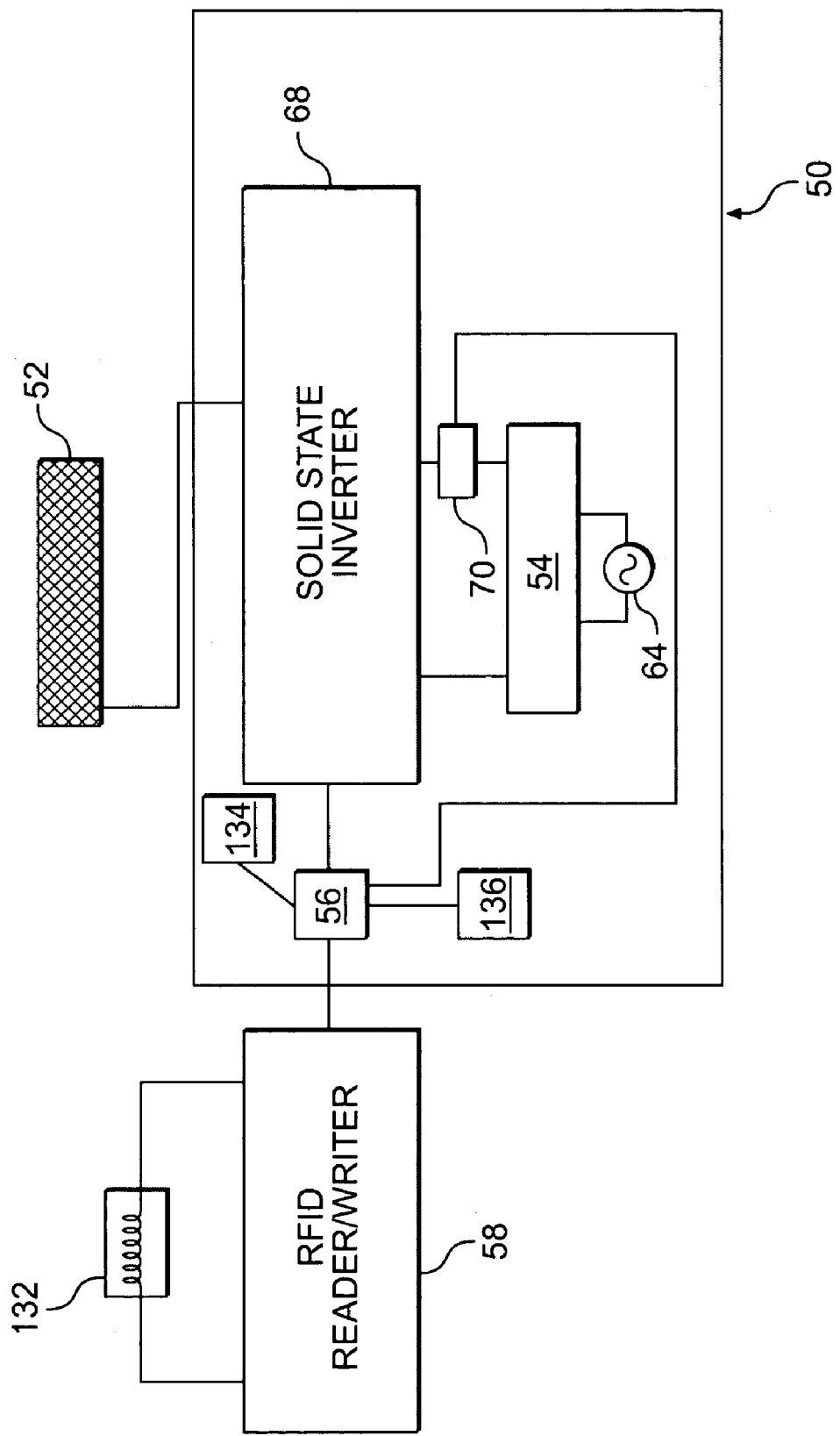
FIG. 6 is a schematic representation of the electronic components of the charging device of the various embodiments.

As shown in more detail in FIG. 6, the circuit board 50 preferably includes (i) a rectifier 54 for converting alternating current from the wall outlet to direct current, (ii) a solid-state inverter 68, coupled to the rectifier 54, for converting the direct current into ultrasonic frequency current for powering the field generator 52 (preferably from about 20 kHz to about 100 kHz), and (iii) a microprocessor-based control circuit 56, including a microprocessor operably coupled with the inverter 68 for control thereof. The control circuit 56 may also include a circuit parameter sensor 70 coupled with the control circuit 56 for measuring a parameter related to or dependent on the load experienced by the circuit. This parameter sensor 70 can be, for example, a current sensor within the inverter 68 that measures current through one of the inverter's switching transistors. An indicator light 62 can also be provided to signal, for example, when the field generator 52 is activated and/or when the heat storage unit 2 is fully charged.

Preferably, the field generator 52 comprises a copper-based induction coil that is either printed on or otherwise applied to the circuit board 50. The field generator 52 could alternatively be comprised of other metal or alloy wires or coils that generate a magnetic field when alternating current is passed through them, and may be embodied as a separate element from the circuit board 50, as shown in the drawing figures. Induction coils can have either flat or curved configurations, but a cylindrical coil is preferred because it provides the most efficient heating. Preferably, the induction coil is positioned such that when the heat storage unit 2 is docked with the charging device 6, the distance between the induction coil and the heatable element 10 is less than about 0.7 cm. Larger distances can be used, but will require more power to be supplied to the induction coil to generate a magnetic field large enough to heat the heatable element 10, since the required power is proportional to the square of the distance between the coil and the heatable element.

As described above, the magnetic field is generated external to the heat storage unit 2, i.e., by the charging device 6, and the heat storage unit 2 does not itself include any components for generating the magnetic field. Alternatively, the induction coil 52 can be incorporated within the body of the heat storage unit 2, in fixed proximity to the heatable element 10, as shown in FIG. 4E. Opposite ends of the induction coil 52 can be electrically connected to a pair of electrical contacts 28 that is accessible from the exterior of the heat storage unit 2. Meanwhile, the charging device 6 has a pair of corresponding electrical contacts 72 that, when the heat storage unit 2 is docked with the charging device 6, provides an electrical connection between the induction coil 52 and the plug deck 64 of the charging device 6.

Optionally, a radio-frequency identification ("RFID") reader or reader/writer 58 can also be coupled to the control circuit 56. RFID is a type of automatic identification technology, similar to bar code technology, except that RFID uses radio frequency instead of optical signals. The reader (or reader/writer) 58 produces a low-level radio frequency magnetic field, typically either at 125 kHz or at 13.56 MHz. This magnetic field emanates from the reader (or reader/writer) 58 by means of a transmitting antenna 132, typically in the form of a coil. Meanwhile, the heat storage unit 2 can include an RFID tag 22 (as best seen in FIGS. 1D and 2A), which typically includes an antenna and an integrated circuit (not shown). The RFID tag 22 is preferably affixed to the outside of the heat storage unit 2, such as by adhesive, bonding, fasteners, or the like. Alternatively, the RFID tag 22 may be formed integrally with the heat storage unit 2, such as, for example, by being molded within a portion of the heat storage unit 2, or applied to the container 30.

The RFID system can be either a read-only or a read/write system. Read-only systems, as their name suggests, permit the reader to receive information from the tag, but not vice versa. Read/write systems, on the other hand, permit two-way communication between the tag and the reader/writer, and each of these components typically includes an electronic memory for storing information received from the other component. The preferred embodiment described herein utilizes a read/write RFID system.

In order to assure high integrity, interference-free transmissions between the RFID tag 22 and the reader/writer 58, the control circuit 56 preferably limits transmissions between the tag 22 and the reader/writer 58 to times when the field generator 52 is not generating a magnetic field F. Some RFID systems, however, such as the TagSys C330 RFID tag and P031 RFID reader are able to communicate even when the field generator 52 is generating a magnetic field F.

The RFID tag 22 can be used to signal the reader/writer 58 whenever an appropriate heat storage unit 2 is placed in the charging device 6, so that the control circuit 56 can activate the field generator 52. Thus, the field generator 52 will not be activated if an improper object, or no object at all, is placed in the charging device 6. Applying an RFID tag 22 to the container 30, instead of or in addition to the heat storage unit 2, can prevent charging of the heat storage unit if an inappropriate container is connected to the heat storage unit, or if no container is connected to the heat storage unit, thereby enhancing the safety of the system.

In a more advanced embodiment, the RFID tag 22 can also transmit to the reader/writer 58 information regarding preferred heating conditions (e.g., heat at 180° F. (82.2° C.) for five minutes, "off" for one minute, and so on) for the particular heat storage unit 2 used. The RFID tag 22 can also be used to transmit information to the reader/writer 58 regarding the identity of the flowable product to be used with the heat storage unit 2, such as, for example, a liquid cleaning solution, shaving cream or gel, lotion, or the like, in addition to or instead of transmitting detailed heating instructions. The control circuit 56, meanwhile, may also include an electronic memory 134 having stored therein multiple heating algorithms, each one designed for heating a different type of flowable product formulation. Thus, whenever a heat storage unit 2 containing a particular type of flowable product is placed in the charging device 6, the RFID tag 22 transmits to the reader/writer 58 the identity of the flowable product, and the control circuit 56 initiates the appropriate heating algorithm for that formulation.

Optionally, there may be provided a writable electronic memory (not shown) associated with the RFID tag 22. The writable electronic memory may contain stored information, which is periodically updated by transmissions from the reader/writer 58, such as information relating to the heating history of the heat storage unit 2. This way, a real-time clock 136 connected to the control circuit 56 can keep track of how long a particular heat storage unit 2 has been heated and how recently. In this manner, the control circuit 56 can effectively prevent overheating of the heat storage unit 2, as in the case when the heat storage unit 2 has not fully dissipated the heat stored therein when it is again plugged into the charging device 6. Instead of, or in addition to, the electronic memory, the RFID tag may be provided with a temperature sensor (not shown). An example of a read/write system with temperature sensing capability is the TagSys C330 RFID tag with an external temperature sensor and the accompanying P031 RFID reader, mentioned above. The temperature sensor can be placed in thermal communication with the portion of the heat storage unit 2 whose temperature is advantageously monitored during the charging process, and thus is useful in preventing the heat storage unit 2 from being over-charged. It is also possible for the temperature sensor to indicate to a user, either graphically, pictorially, or audibly, the temperature of the heat storage unit 2.

Alternatively, if an MiCM is used as the heatable element 10, the charging device may be configured to generate an electric field having a frequency in the microwave range. The microwave charging device could be configured either as a specialized charging device similar to that of FIG. 1A except having a microwave generator rather than a magnetic field generator, or as a conventional microwave oven.

Second Embodiment

A second preferred embodiment of our invention is described with reference to FIGS. 2A–2C. In this embodiment, as best seen in FIG. 2A, the heat storage unit 2 is configured as an overcap 40 that is detachably securable to a pressurized container 30 that contains a flowable aerosol product. The overcap 40 and container 30 together comprise an aerosol dispenser assembly 300. The overcap 40 is detachably secured to the container 30 by a retaining lip formed in the interior of the overcap 40. In this embodiment, the overcap 40 substantially covers the exterior of the container 30. The overcap 40 is adapted to engage an attachment portion 66 formed on the charging device 6 for storage and during charging.

The heat storage unit 2 of this embodiment is configured similarly to the third variation of the first embodiment, discussed above and depicted in FIG. 1C. The heat storage unit 2 of this embodiment is configured with the heat-retentive material 8 and the heatable element 10 formed separately. The passage in this embodiment is an enlarged reservoir 20 formed in the interior of the heat storage unit 2. The reservoir 20 has an inlet 16 and an outlet 18 positioned at substantially opposite ends of the reservoir 20, and defines a flow path for the flowable product. The reservoir 20 is sized to hold at least one dose, and as many as five doses, of the flowable product, i.e., it is a "one shot" system as described above. A valve stem 34 is disposed in an opening 32 formed in the top of the container 30, and is in communication with the inlet 16 of the heat storage unit 2. An actuator 36 is formed in the overcap 40 directly above the valve stem 34. When the actuator 36 is depressed, it in turn depresses the valve stem 34, thereby causing flowable product to be propelled from the pressurized container 30, through the inlet 16, into the reservoir 20 where the flowable product is heated, and ultimately out the outlet 18 to be dispensed.

The charging device 6 of this embodiment includes substantially the same components disclosed above with respect to the first embodiment, including an electrical plug deck 64, a circuit board 50, a magnetic field generator 52, and a detection device 58. The circuit board 50 includes, among other elements, a control device 56 and a solid-state inverter 68. In this embodiment, shown in FIG. 2A, the rectifier 54 is depicted as a separate unit, although this arrangement is not crucial to the function of this embodiment. The detection device is preferably an RFID reader/writer 58 and communicates with an RFID tag 22 in the dispenser housing 40 in the same manner in as the first embodiment described above. Furthermore, the charging device of this embodiment includes an activator switch 60 for manually activating the charging device 6 to begin charging the heat storage unit 2, and an indicator light 62 for indicating when the charging device 6 is charging. If the RFID tag is a passive, read-only device, then it is preferably arranged parallel to the reader and no more than about 3–4 cm from the antenna. Active tags, on the other hand, need not be parallel, and can be read/written to by the detection device 58 from significantly greater distances.

If the charging device 6 includes both an RFID reader/writer 58 and a manual activator switch 60, as shown in FIG. 2A, the charging device 6 will not be activated to generate a magnetic field F until the RFID reader/writer 58 detects that the dispenser assembly 300 is placed in the attachment portion 66 and the activator switch 60 is subsequently depressed. Thus, a user may attach the dispenser assembly 300 to the attachment portion 66 simply for storage. When the user is next ready to use the dispenser assembly 300, he or she simply has to depress the activator switch 60, thereby activating the charging device 6 to generate a magnetic field F to charge the heat storage unit 2. The charging device will notify the user by one of the previously discussed indications (i.e., either indicator light 62 or an audible signal) when the heat storage unit 2 is fully charged.

Third Embodiment

A third preferred embodiment of our invention is described with reference to FIGS. 3A and 3B. As best seen in FIG. 3A, the heat storage unit 2 is again configured as an overcap 40 of an aerosol dispenser assembly 300. This embodiment is similar to the second embodiment in many aspects. In this embodiment, however, the overcap 40 of the dispenser assembly 300 is smaller and fits only over the top portion of a container 30.

The heat storage unit 2 of this embodiment is permanently installed with the housing 40 of the aerosol dispenser assembly 300 during the manufacturing process. However, in this embodiment, the heat storage unit 2 is configured as a "point of use" heat storage unit, similar to that of the first variation of the first embodiment shown in FIG. 1A. The heat storage unit 2 is constructed with the heatable element 10 and the heat-retentive material 8 formed together as a uniform mixture of heatable and heat-retentive material. The exterior of the heatable element 10 and the heat-retentive material 8 mixture is coated with an insulating layer 24. A circuitous passage 12 is formed through the heat storage unit 2 and defines a long flow path for the flowable product during dispensing. An inlet 16 and outlet 18 are formed at opposite ends of the passage. An actuator 36 is formed in the overcap 40 directly above the heat storage unit 2. When the actuator 36 is depressed, it in turn depresses the heat storage unit 2, thereby depressing the valve stem 34 and causing flowable product to be propelled from the pressurized container 30, through the inlet 16, through the circuitous passage 12 where the flowable product is heated, and ultimately out the outlet 18 to be dispensed.

The charging device 6 of the third embodiment is substantially similar to that of the second embodiment, except for the absence of a manual activation switch and the particular configuration of the attachment device 66. In the third embodiment, the attachment device 66 takes the form of an arcuate support arm, which fits around the circumference of the container 30 to secure the dispenser assembly 300 to the charging device 6. The charging device 6 includes an electrical plug deck 64, a circuit board 50, a magnetic field generator 52, and a detection device 58. A detailed description of the various electrical components will be omitted since these elements have been previously discussed in detail in the description of the first and second embodiments.

Fourth Embodiment

A fourth preferred embodiment of our invention is described with reference to FIGS. 4A–4E. In this embodiment, the heat storage unit 2 is configured as an overcap 40 that is detachably securable to an aerosol container 30 that contains a flowable product such as, for example, shaving gel. The overcap 40 and container 30 together comprise an aerosol dispenser assembly 300. The overcap 40 is detachably secured to the container 30 by a retaining lip formed in the interior of the overcap 40. The overcap 40 can be detached from the container 30 by pressing a release button 42. The dispenser assembly 300 of this embodiment is used in conjunction with a charging device 6 that has an opening through which the overcap 40 extends when the dispenser assembly 300 is docked with the charging device 6. The overcap 40 can be secured within the charging device 6 by any suitable means, such as, for example, the coupling assembly disclosed in commonly-assigned U.S. Pat. No. 6,415,957, the disclosure of which is incorporated by reference herein.

Figures 4A, 4B:
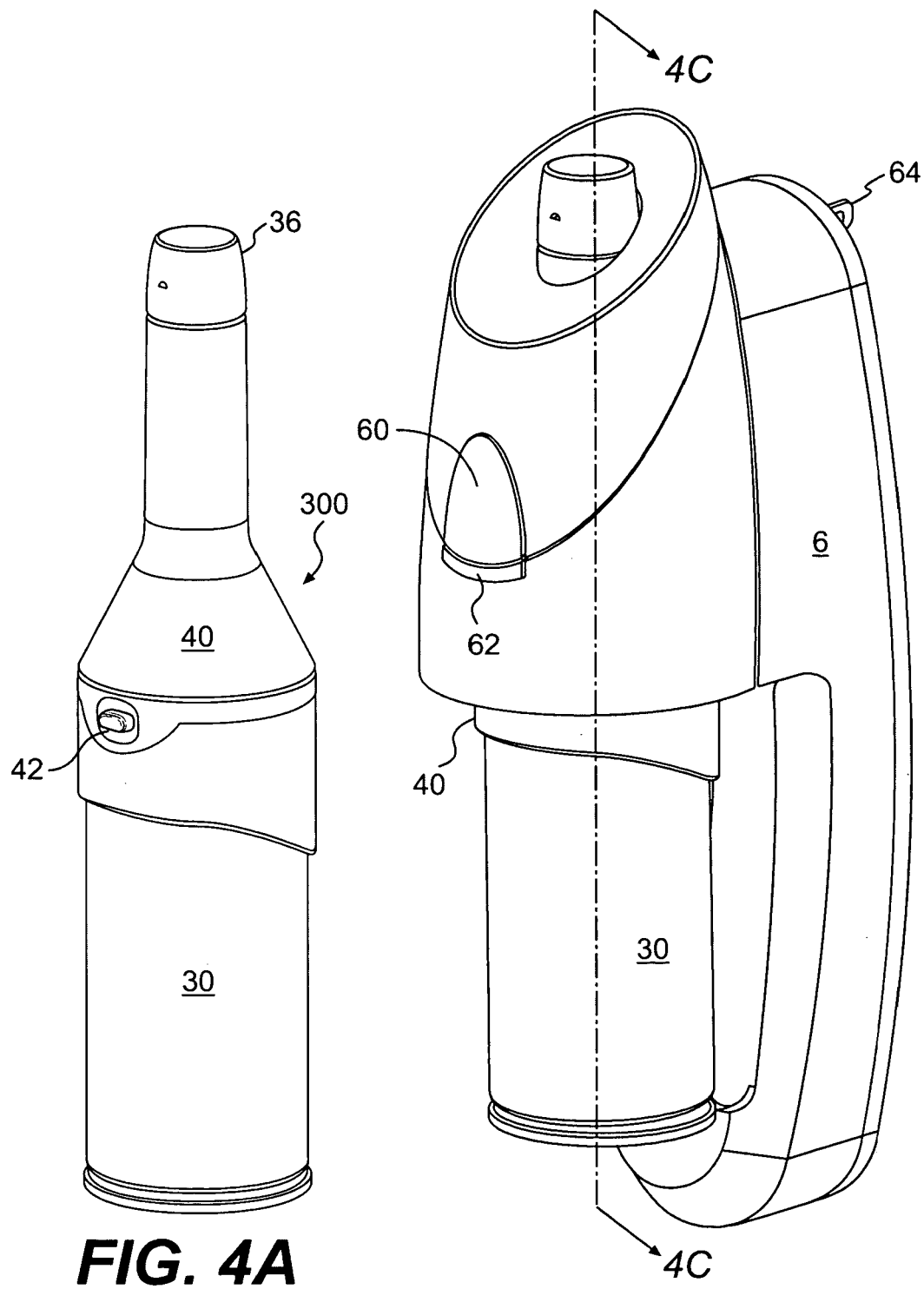
FIG. 4A is a perspective view of a hot-shave dispenser assembly employing a heat storage unit according to a fourth embodiment.
FIG. 4B is a perspective view of a system including the hot-shave dispenser assembly and heat storage unit of FIG. 4A and a wall-mounted charging device.
Figure 4C:
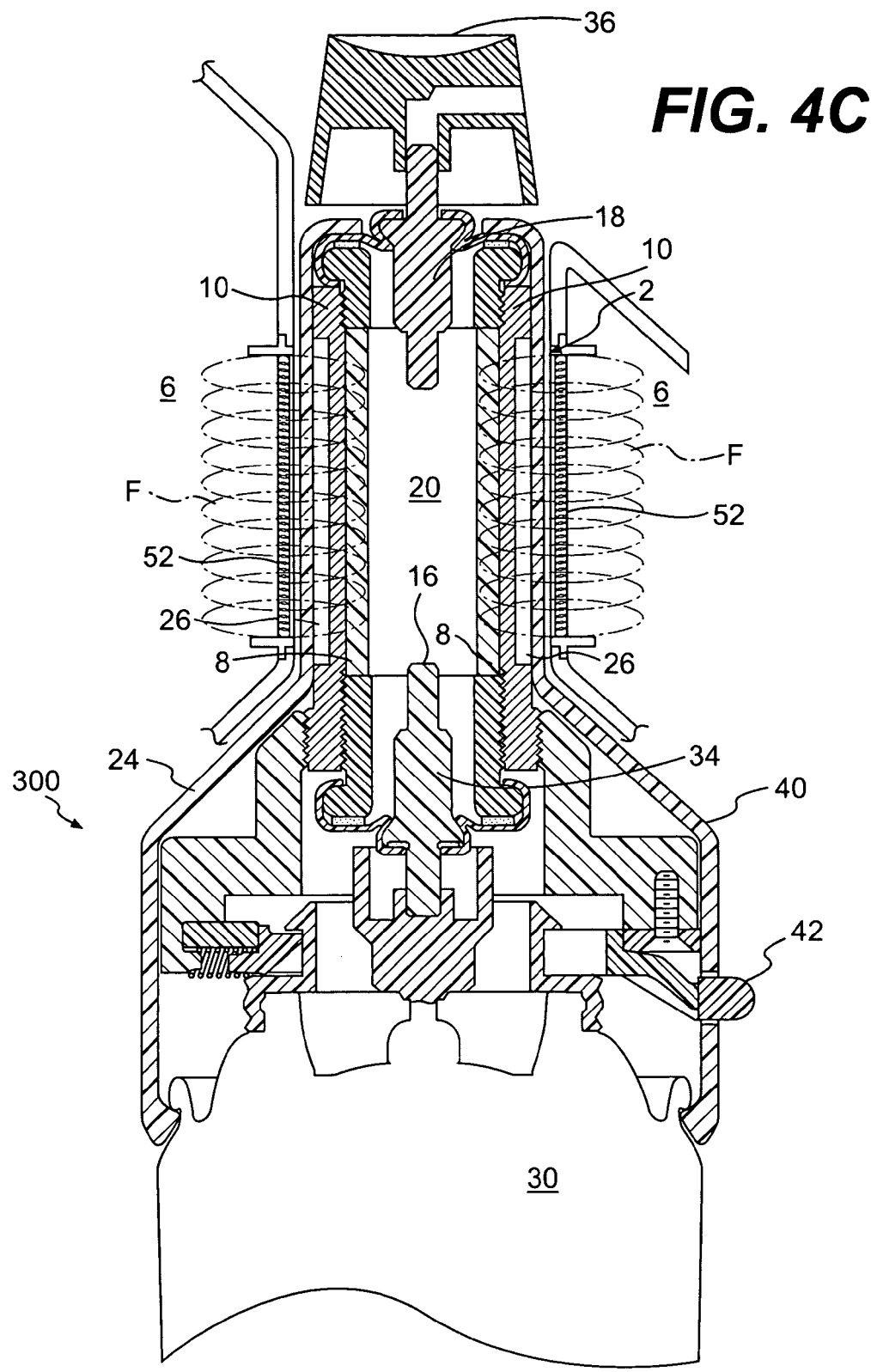
FIG. 4C is a cross-sectional view of the system of FIG. 4B, taken along line 4C—4C shown in FIG. 4B.

In a first variation of this embodiment, shown in FIG. 4C, the heat storage unit 2 includes a reservoir 20 that is defined by a chamber comprising the heatable element 10. The heatable element 10 preferably comprises magnetically-compatible stainless steel having a thickness between about 0.14 cm to about 0.24 cm (about 0.055 inch to about 0.095 inch), most preferably 430 grade stainless steel with a thickness of about 0.19 cm (0.075 inch). A sleeve comprising a heat-retentive material 8, preferably polyethylene having a thickness of about 0.25 cm (0.1 inch), lines the interior of the reservoir 20. The overcap 40 preferably also includes an insulating shell 24 made of polypropylene, ABS, or the like. An air gap 26 may optionally be provided between the heatable element 10 and the insulating shell 24 to provide additional insulation.

The reservoir 20 has an inlet 16 and an outlet 18 positioned at substantially opposite ends of the reservoir 20. The reservoir 20 is sized to hold at least one dose, and as many as five doses, of the flowable product, i.e., it is a "one shot" system. A valve stem 34 is disposed in flow communication with the inlet 16. The overcap 40 includes an actuator 36 which, when depressed, causes the flowable product to be propelled from the pressurized container 30, through the inlet 16, into the reservoir 20 where the flowable product is heated, and ultimately out the outlet 18.

The charging device 6 of this embodiment includes substantially the same components disclosed above with respect to the third embodiment, including, among other things, a plug deck 64, a circuit board 50, an induction coil 52 for generating a magnetic field F, an activator switch 60, an indicator light 62, and an RFID reader (not shown) that detects an RFID tag (also not shown) applied to or incorporated within the overcap 40 or the container 30.

In operation, the charging device 6 can be activated automatically, such as when it is detected that the heat storage unit 2 is docked with the charging device 6, or manually, by pressing the activator switch 60. The indicator light 62 can, for example, be programmed to blink red while the heat storage unit 2 is charging, and turn green when the heat storage unit 2 is fully charged.

The temperature to which the heatable element 10 is heated depends on several factors, including the desired temperature to which the flowable product is to be heated, as well as the structure of the heat storage unit 2. Shaving gel, for example, preferably is heated to a temperature of between about 49° C. to about 60° C. (about 120° F. to about 140° F.). If the heat unit storage unit is configured as shown in FIG. 4C and described above, this requires heating the heatable element 10 to a temperature of between about 54° C. to about 79° C. (about 130° F. to about 175° F.).

Figure 4D:
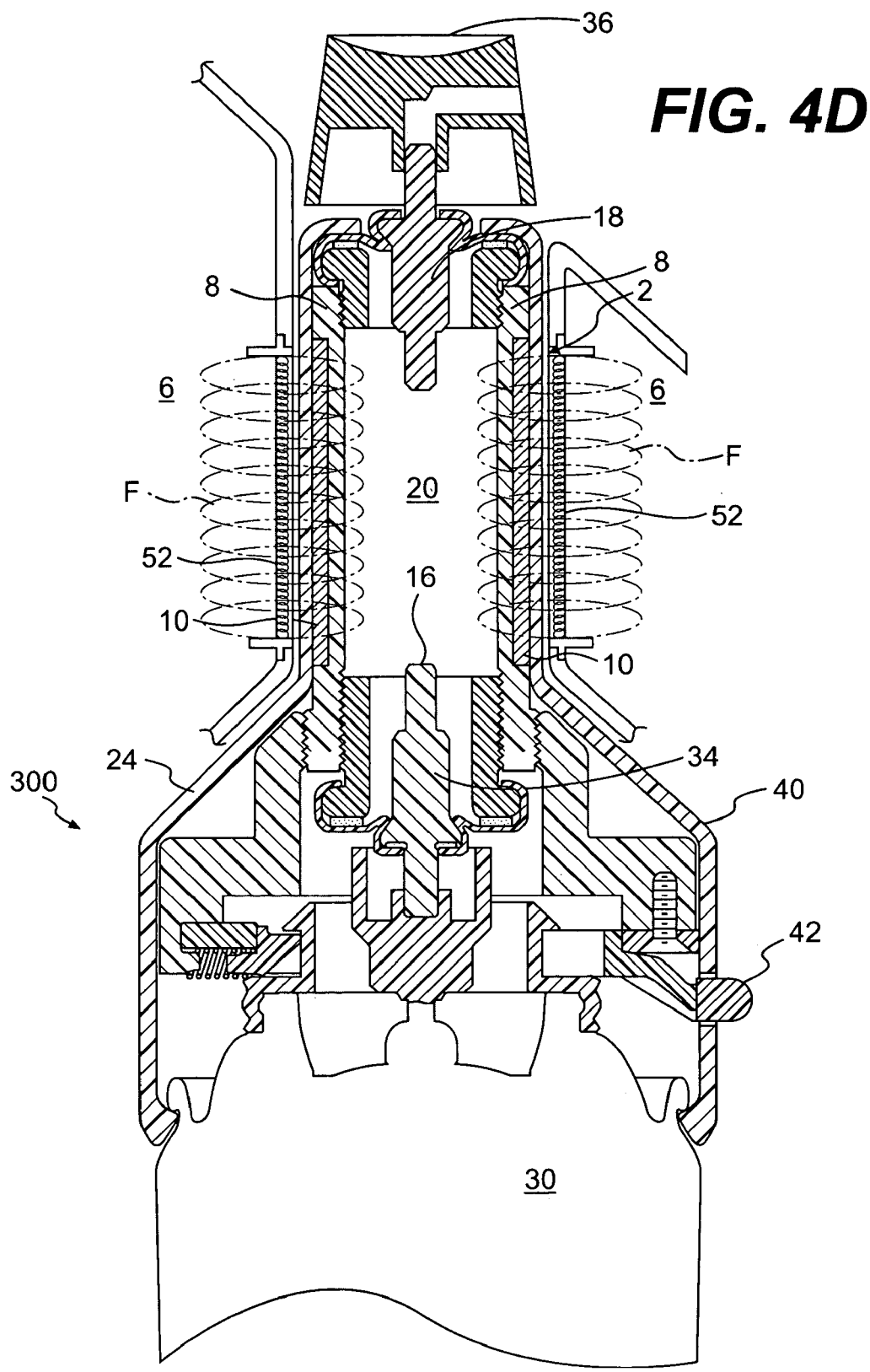
FIG. 4D is a cross-sectional view of an alternative configuration to that shown in FIG. 4C.
Figure 4E:
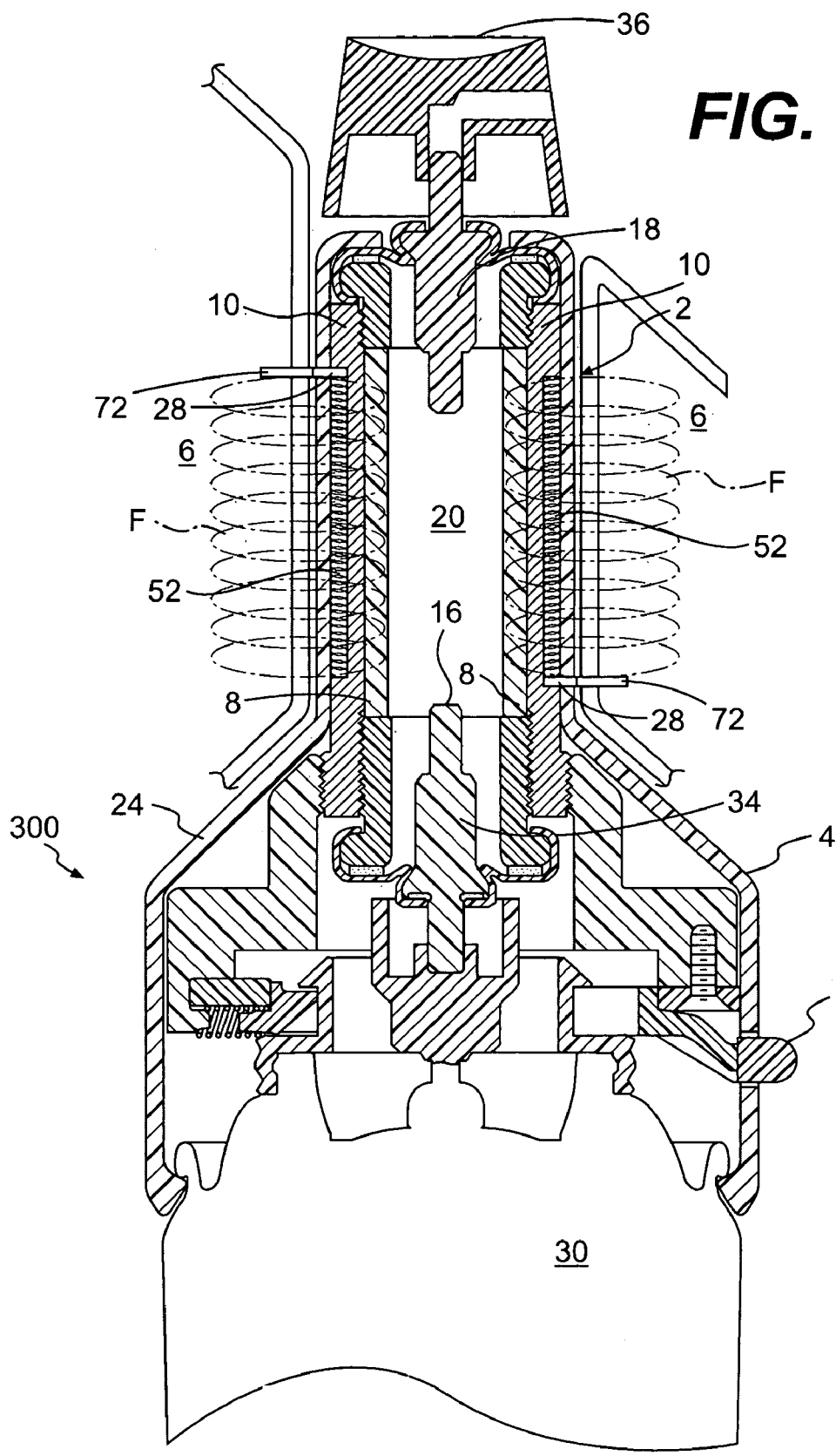
FIG. 4E is a cross-sectional view of another alternative configuration to that shown in FIG. 4C.

A second variation of the fourth embodiment is illustrated in FIG. 4D. In this variation, the reservoir 20 is defined by a chamber comprising the heat-retentive material 8, such as polyethylene or polypropylene. The exterior of the chamber is lined by a sleeve comprising the heatable element 10. The chamber can be is formed by injection molding, for example. Alternatively, the chamber could be manufactured as an extruded sleeve in which the heatable element, preferably GRAFOIL® sheeting, is sandwiched between layers of the heat-retentive material. In yet another alternative embodiment, the heatable element comprises a porous, mesh-like, MCM, preferably stainless steel, that is disposed within the chamber, which is preferably made of polyethylene. Because the mesh is porous, the flowable product is able to pass directly through the heatable element, thereby enabling rapid heating of the flowable product.

Preferably, in all of the aforementioned embodiments, the heat storage unit 2 and charging device 6 are configured such that the maximum distance between the heatable element 10 and the induction coil 52 is no more than about 0.64 cm (0.25 inch). Larger distances can be used, but will require a greater input of energy to the coil to generate a field large enough to heat the heatable element.

A third variation of the fourth embodiment is illustrated in FIG. 4E. This variation is similar to the embodiment shown in FIG. 4C, except that the induction coil 52 is incorporated within the overcap 40, and corresponding electrical contacts 28 and 72 are provided on the overcap 40 and the charging device 6, respectively.

Fifth Embodiment

A fifth preferred embodiment of our invention is described with reference to FIGS. 5A–5C. In this embodiment, the heat storage unit 2 is configured as a flexible, porous pad 44 that functions as a "hot sponge" for cleaning or personal care treatment applications such as shaving, for example. A burstable pouch 14, also known as a blister pack, is incorporated within the pad 44 and contains a flowable product, such as a cleaning solution or shaving gel. Suitable burstable pouches for use in our invention are available from Klocke of America, Inc., among others.

The pad 44 comprises a combination of heat-retentive and heatable materials 8, 10. Preferably, the pad comprises two or three layers of GRAFOIL® sheeting, with each layer being sandwiched between a layer of a solid-to-solid phase change material. Alternatively, the pad could comprise flakes of the heatable material dispersed throughout the heat-retentive material. In still further variations, the pad could be comprised of graphite fibers interspersed within a woven polymer matting material, or the pad could be comprised of a woven graphite fiber matting material interwoven with heat-retentive polymer fibers.

Figure 5A:
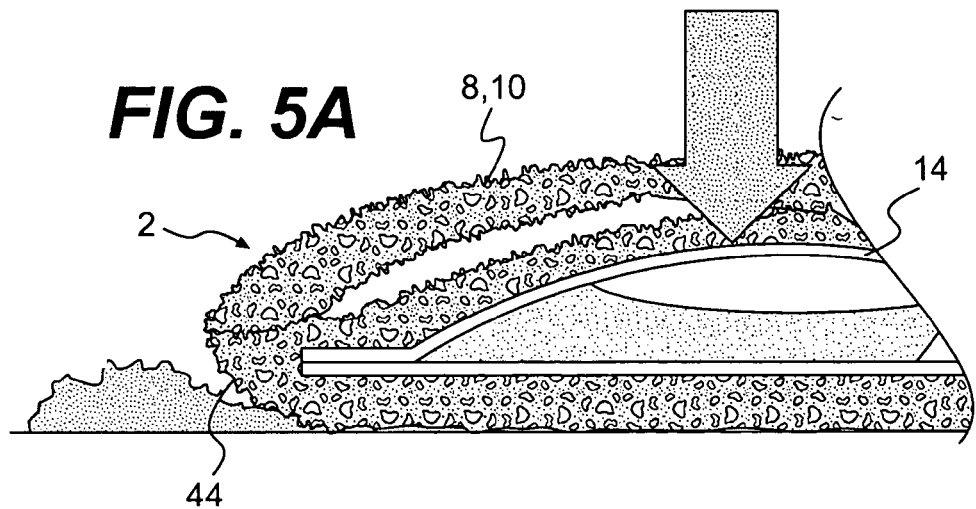
FIG. 5A is a cross-sectional view of a hot storage unit configured as a porous pad, in accordance with a fifth embodiment of our invention.
Figure 5B:
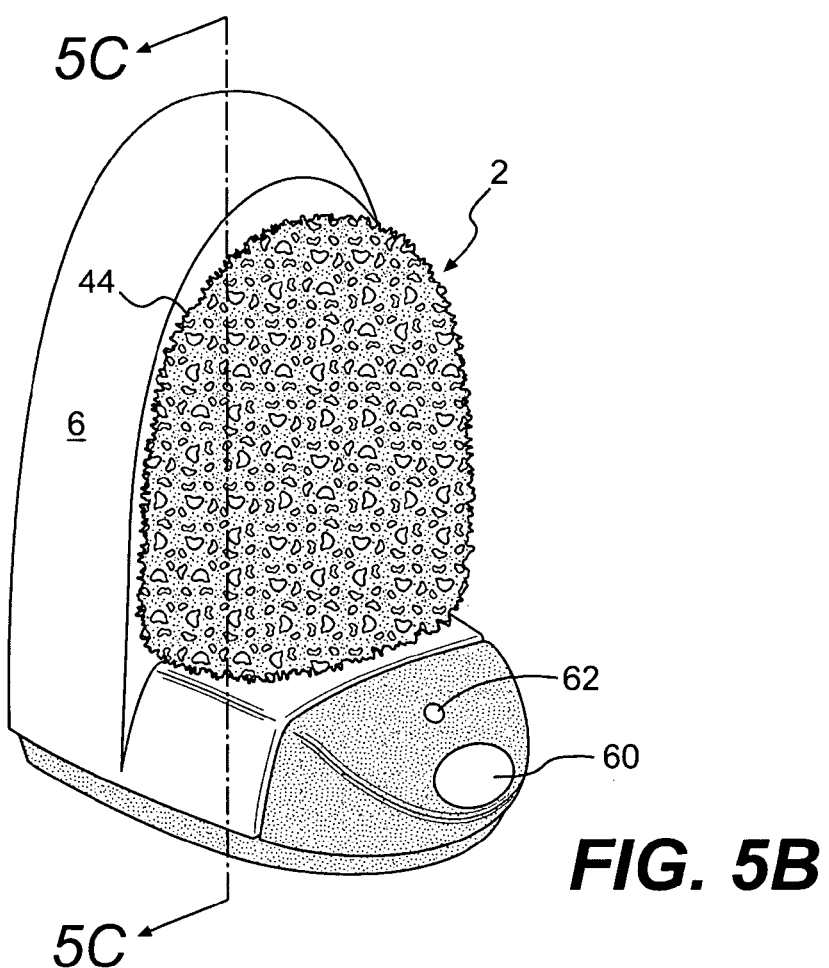
FIG. 5B is a perspective view of a system including the porous pad of FIG. 5A and a charging device.
Figure 5C:
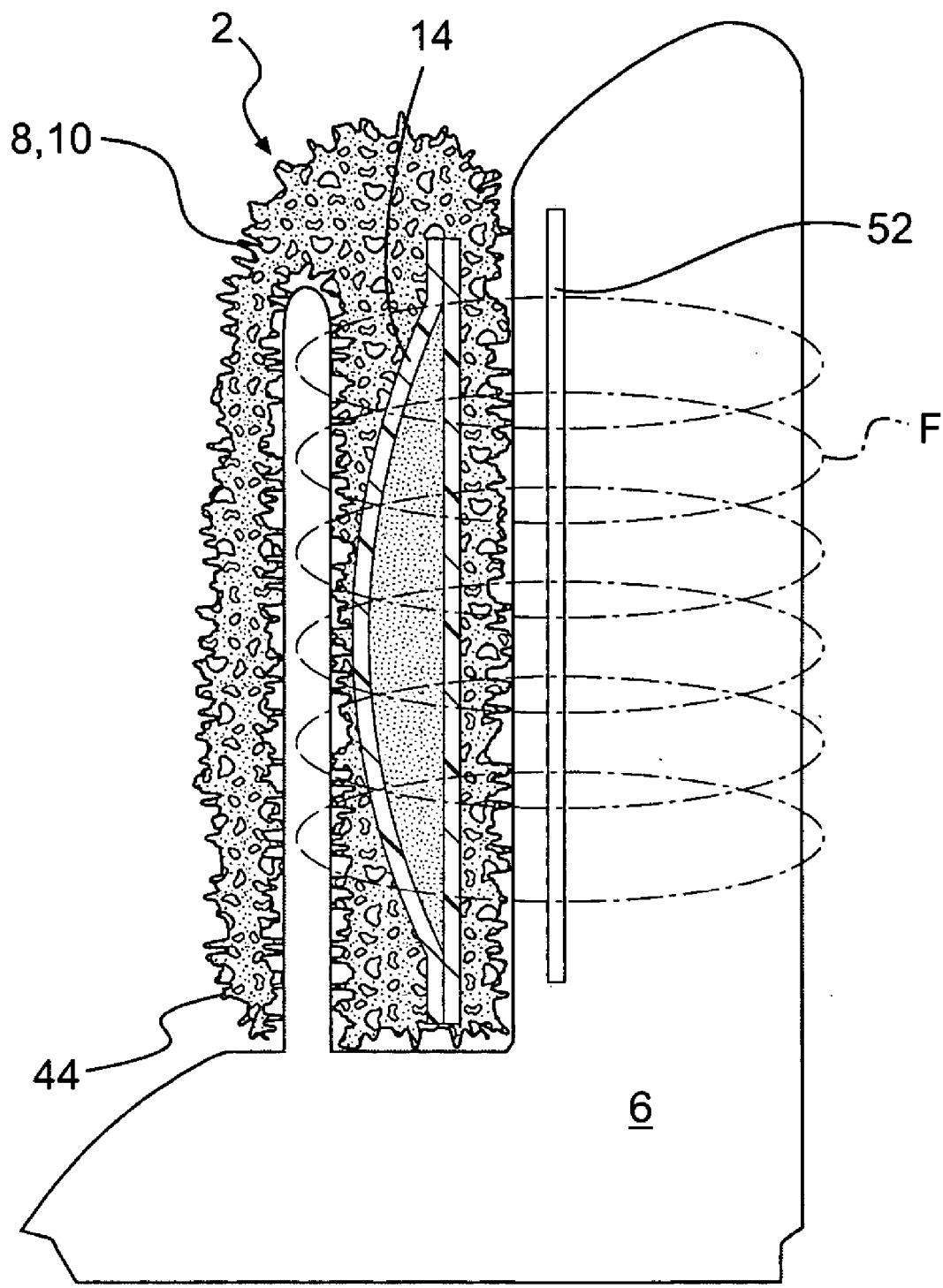
FIG. 5C is a cross-sectional view of the system of FIG. 5B, taken along line 5C—5C shown in FIG. 5B.

As with the previous embodiments, the heat storage unit 2 of FIGS. 5A–5C is energized using a charging device 6. The charging device 6 contains substantially the same functional components previously described, including, among other things, a circuit board 50, an induction coil 52 for generating a magnetic field F, an activator switch 60, and an indicator light 62. In the embodiment illustrated in FIGS. 5B and 5C, the charging device is activated manually by pressing the activator switch 60 when the pad 44 is docked with the charging device 6.

In operation, the flowable product is dispensed from the pad 44 by exerting pressure on the pad 44, which in turn compresses the burstable pouch 14 and forces the flowable product out of the pouch and into the pad 44. The pad 44 is porous and contains numerous passages therein through which the flowable product passes. As the flowable product makes its way through these passages, the flowable product is warmed by the heatable and heat-retentive materials that make up the pad.

The entire pad 44, including the burstable pouch 14, could be made to be disposable once the flowable product is depleted, or the pad 44 could be reused and just the pouch could be replaced as needed. Alternatively, the pad need not even include a burstable pouch, and could be used simply by applying the flowable product directly onto the pad prior to or shortly after heating.

While our invention has been described with respect to several preferred embodiments, these embodiments are provided for illustrative purposes only and are not intended to limit the scope of the invention. In particular, we envision that the various features of the several embodiments of our invention may be combined and modified to suit the needs of a particular application. For example, the heat storage units of our invention could advantageously be used with any sort of dispenser and with any sort of flowable product where it is desirable to dispense the flowable product at an elevated temperature. Thus, other applications that might benefit from the advantages of our invention include, personal products, such as hair spray, hair gel, mousse, shampoo, conditioner and the like, food products, such as condiments, ice cream toppings (hot fudge, caramel, etc.), soups, and the like, industrial products, such as paint sprayers, pressure washers, and the like, as well as numerous other applications. Moreover, the preferred methods described for manufacturing the heat storage unit of our invention are merely representative. The various method steps described herein can be performed in different combinations and sequences with each other and with other method steps not specifically described herein.

Although specific components, materials, configurations, arrangements, etc., have been shown and described with reference to several preferred embodiments, our invention is not limited to these specific examples. One of ordinary skill in the art will realize that various modifications and variations are possible within the spirit and scope of our invention, which is intended to be limited in scope only by the accompanying claims.

We claim:

1. A heat storage unit, comprising:
   a body having a passage defined by an inlet and an outlet formed therein through which a flowable product passes;
   a heatable element incorporated within the body in thermal communication with the passage, the heatable element comprising either a magnetically-compatible material or a microwave-compatible material; and
   a heat-retentive material in thermal communication with the beatable element, the heat-retentive material comprising a solid-to-solid phase change material.

2. The heat storage unit of claim 1, wherein the beatable element comprises a magnetically-compatible material that is heatable by locating the heatable element in a magnetic field.

3. The heat storage unit of claim 2, wherein the magnetic field is generated external to the heat storage unit, and the heat storage unit does not include any components for generating a magnetic field to heat the heatable element.

4. The heat storage unit of claim 2, wherein the heat storage unit is cordless.

5. The heat storage unit of claim 2, further comprising:
   an induction coil incorporated within the body in proximity to the heatable element; and
   a pair of electrical contacts accessible from the exterior of the body, each contact being electrically connected to a respective end of the induction coil.

6. The heat storage unit of claim 2, wherein the heatable element comprises a ferromagnetic material.

7. The heat storage unit of claim 6, wherein the heatable element comprises stainless steel.

8. The heat storage unit of claim 6, wherein the heatable element comprises a temperature sensitive alloy.

9. The heat storage unit of claim 2, wherein the heatable element comprises a graphite-based material.

10. The heat storage unit of claim 1, wherein the heatable element comprises a microwave-compatible material that is heatable by exposing the heatable element to microwave radiation.

11. The heat storage unit of claim 1, wherein the passage in the body comprises an inlet for receiving the flowable product into the body, an outlet for directing the discharge of the flowable product from the body, and a reservoir located between the inlet and the outlet, the reservoir being sized to accommodate at least one dose of the flowable product.

12. The heat storage unit of claim 1, wherein the passage in the body is circuitous, such that the passage is at least twice as long as any dimension of the body.

13. The heat storage unit of claim 1, wherein the heat-retentive material comprises a polyethylene resin and at least one additive.

14. The heat storage unit of claim 13, wherein the at least one additive is selected from the group consisting of structural additives, thermal conductivity additives, antioxidants, and combinations thereof.

15. The heat storage unit of claim 1, further comprising an identification device applied to or incorporated within the body, the identification device storing information about the heat storage unit or about a flowable product used therewith.

16. The heat storage unit of claim 15, wherein the identification device is a radio frequency identification tag.

17. The heat storage unit of claim 1, wherein the body is configured as a cartridge that is detachably securable to each of a plurality of different flowable product dispensers.

18. The heat storage unit of claim 1, wherein the body is configured as an overcap that is detachably securable to an aerosol container.

19. The heat storage unit of claim 18, wherein the heatable element defines a reservoir within the body that is sized to accommodate at least one dose of the flowable product.

20. The heat storage unit of claim 19, wherein the heat-retentive material comprises a sleeve that lines at least a portion of the interior of the reservoir.

21. The heat storage unit of claim 18, wherein the heat-retentive material defines a reservoir within the body that is sized to accommodate at least one dose of the flowable product.

22. The heat storage unit of claim 21, wherein the heatable element comprises a sleeve that lines at least a portion of the exterior of the reservoir.

23. The heat storage unit of claim 21, wherein the heatable element comprises a porous, mesh-like, magnetically-compatible material that is disposed within the reservoir.

24. The heat storage unit of claim 18, wherein the heatable element and the heat-retentive material are configured as an extruded sleeve in which the heatable element is sandwiched between layers of the heat-retentive material, and the sleeve defines a reservoir within the body that is sized to accommodate at least one dose of the flowable product.

25. The heat storage unit of claim 1, wherein the body is configured as a porous pad having incorporated therein a burstable pouch containing the flowable product.

26. The heat storage unit of claim 25, wherein the body includes a plurality of passages through which the flowable product passes, and the heatable element is in thermal communication with each of the plurality of passages.

27. The heat storage unit of claim 1, wherein the heatable element and the heat-retentive material are formed together as a mixture of heatable and heat-retentive material.

28. A dispenser assembly, comprising:
the heat storage unit of claim 1;
a container to which the heat storage unit is detachably secured such that an opening in the container is in flow communication with the passage in the body of the heat storage unit; and
an actuator for selectively dispensing the flowable product from the container, through the passage in the body of the heat storage unit, and out of an exit opening of the dispenser assembly.

29. The dispenser assembly of claim 28, further comprising a pumping mechanism for drawing the flowable product out of the container.

30. The dispenser assembly of claim 28, wherein the container is an aerosol container, and the heat storage unit is configured as an overcap for the container.

31. The dispenser assembly of claim 28, further comprising an identification device applied to or incorporated within either the heat storage unit or the container, the identification device storing information about the heat storage unit, about the container, or about the flowable product used with the dispenser assembly.

32. The dispenser assembly of claim 31, wherein the identification device is a radio frequency identification tag.

33. A heat storage unit for heating a flowable product, the heat storage unit comprising:
a body having a passage formed therein through which a flowable product passes;
a heatable element incorporated within the body in thermal communication with the passage, the heatable element comprising either a magnetically-compatible material or a microwave-compatible material that is heatable by locating the heatable element in a field generated external to the heat storage unit;
a heat-retentive material incorporated within the body in thermal communication with the heatable element; and
a radio frequency identification tag applied to or incorporated within the body, the radio frequency identification tag storing information about the heat storage unit or about a flowable product used therewith.

34. The heat storage unit of claim 33, wherein the heatable element comprises a magnetically-compatible material that is heatable by locating the heatable element in a magnetic field.

35. The heat storage unit of claim 34, wherein the heatable element comprises a ferromagnetic material.

36. The heat storage unit of claim 35, wherein the heatable element comprises stainless steel.

37. The heat storage unit of claim 35, wherein the heatable element comprises a temperature sensitive alloy.

38. The heat storage unit of claim 34, wherein the heatable element comprises a graphite-based material.

39. The heat storage unit of claim 33, wherein the heatable element comprises a microwave-compatible material that is heatable by exposing the heatable element to microwave radiation.

40. The heat storage unit of claim 33, wherein the passage in the body comprises an inlet for receiving the flowable product into the body, an outlet for directing the discharge of the flowable product from the body, and a reservoir located between the inlet and the outlet, the reservoir being sized to accommodate at least one dose of the flowable product.

41. The heat storage unit of claim 40, wherein the reservoir is defined by the heat-retentive material, and the heatable element comprises a sleeve that lines at least a portion of the exterior of the reservoir.

42. The heat storage unit of claim 40, wherein the reservoir is defined by the heat-retentive material, and the heatable element comprises a porous, mesh-like, magnetically-compatible material that is disposed within the reservoir.

43. The heat storage unit of claim 40, wherein the reservoir is defined by the heatable element, and the heat-retentive material comprises a sleeve that lines at least a portion of the interior of the reservoir.

44. The heat storage unit of claim 40, wherein the reservoir is defined by an extruded sleeve in which the heatable element is sandwiched between layers of the heat-retentive material.

45. The heat storage unit of claim 40, wherein the heatable element comprises a porous, mesh-like, magnetically-compatible material that is disposed within the reservoir.

46. The heat storage unit of claim 33, wherein the passage in the body is circuitous, such that the passage is at least twice as long as any dimension of the body.

47. The heat storage unit of claim 33, wherein the heat-retentive material comprises a solid-to-solid phase change material.

48. The heat storage unit of claim 47, wherein the heat-retentive material comprises a polyethylene resin and at least one additive.

49. The heat storage unit of claim 48, wherein the at least one additive is selected from the group consisting of structural additives, thermal conductivity additives, antioxidants, and combinations thereof.

50. The heat storage unit of claim 33, wherein the heat-retentive material has a specific heat of at least about 0.4 calories per gram-degree Celsius.

51. The heat storage unit of claim 33, wherein the heat-retentive material has a specific heat of at least about 0.5 calories per gram-degree Celsius.

52. The heat storage unit of claim 33, wherein the heat-retentive material comprises a polymer selected from the group consisting of polyethylene, polypropylene, and nylon.

53. The heat storage unit of claim 33, wherein the body is configured as a cartridge that is detachably securable to each of a plurality of different flowable product dispensers.

54. The heat storage unit of claim 33, wherein the body is configured as an overcap that is detachably securable to an aerosol container.

55. The heat storage unit of claim 33, wherein the heat-retentive material lines at least a portion of the passage.

56. The heat storage unit of claim 33, wherein the heatable element and the heat-retentive material are formed together as a mixture of heatable and heat-retentive material.

57. The heat storage unit of claim 33, wherein the heat storage unit does not include any components for generating a field to heat the heatable element.

58. The heat storage unit of claim 57, wherein the heat storage unit is cordless.

59. A system, comprising:
a heat storage unit, comprising (i) a body having a passage formed therein, (ii) a heatable element incorporated within the body in thermal communication with the passage, the heatable element comprising either a magnetically-compatible material or a microwave-compatible material, and (iii) a heat-retentive material in thermal communication with the heatable element; and
a charging device to which the heat storage unit is detachably docked such that, when the heat storage unit is docked with the charging device and the charging device is activated, a field is generated that encompasses the heatable element of the heat storage unit, thereby raising the temperature of the heatable element.

60. The system of claim 59, wherein the heatable element comprises a magnetically-compatible material, and the charging device includes an induction coil for generating a magnetic field.

61. The system of claim 60, wherein the charging device further comprises a control device for controlling the induction coil to selectively generate the magnetic field.

62. The system of claim 61, wherein the control device automatically activates the induction coil to generate the magnetic field when the heat storage unit is docked with the charging device.

63. The system of claim 60, wherein the charging device further comprises an activator switch for manually activating the charging device to generate the magnetic field.

64. The system of claim 60, wherein the heatable element comprises a ferromagnetic material.

65. The system of claim 64, wherein the heatable element comprises stainless steel.

66. The system of claim 64, wherein the heatable element comprises a temperature sensitive alloy.

67. The system of claim 60, wherein the heatable element comprises a graphite-based material.

68. The system of claim 59, wherein the heatable element of the heat storage unit is a magnetically-compatible material, and the heat storage unit further comprises (i) an induction coil incorporated within the body in proximity to the heatable element, and (ii) a pair of electrical contacts accessible from the exterior of the body, with each contact being electrically connected to a respective end of the coil, and wherein the charging device includes a pair of corresponding electrical contacts that electrically connect to the pair of electrical contacts on the heat storage unit when the heat storage unit is docked with the charging device.

69. The system of claim 59, wherein the heatable element of the heat storage device is a microwave-compatible material, and the charging device includes a microwave-generating device.

70. The system of claim 59, wherein the heat storage unit further comprises an identification device that stores information about the heat storage unit or about a flowable product used therewith, and wherein the charging device includes a detection device that detects the information stored by the identification device.

71. The system of claim 70, wherein the identification device is a radio frequency identification tag.

72. The system of claim 71, wherein the radio frequency identification tag signals the charging device to generate the field.

73. The heat storage unit of claim 59, wherein the passage in the body of the heat storage unit comprises an inlet for receiving a flowable product into the body, an outlet for directing the discharge of the flowable product from the body, and a reservoir located between the inlet and the outlet, the reservoir being sized to accommodate at least one dose of the flowable product.

74. The heat storage unit of claim 59, wherein the passage in the body of the heat storage unit is circuitous, such that the passage is at least twice as long as any dimension of the body.

75. The system of claim 59, wherein the heat-retentive material is a solid-to-solid phase change material.

76. The system of claim 75, wherein the heat-retentive material comprises a polyethylene resin and at least one additive.

77. The system of claim 76, wherein the at least one additive is selected from the group consisting of structural additives, thermal conductivity additives, antioxidants, and combinations thereof.

78. The system of claim 59, wherein the heat-retentive material has a specific heat of at least about 0.4 calories per gram-degree Celsius.

79. The system of claim 59, wherein the heat-retentive material has a specific heat of at least about 0.5 calories per gram-degree Celsius.

80. The system of claim 59, wherein the heat-retentive material comprises a polymer selected from the group consisting of polyethylene, polypropylene, and nylon.

81. The system of claim 59, wherein the heat storage unit is configured as a cartridge that is detachably securable to each of a plurality of different flowable product dispensers.

82. The system of claim 59, wherein the heat storage unit is configured as an overcap that is detachably securable to an aerosol container.

83. The system of claim 59, wherein the heat storage unit is configured as a porous pad.

84. The system of claim 59, wherein the charging device includes a detection device that detects when an object having a radio frequency identification tag with particular information stored therein is docked with the charging device, and the charging device only generates the field when an object having a radio frequency identification tag with the particular information stored therein is detected.

85. A heat storage unit, comprising:
  a body, configured as an overcap that is detachably securable to an aerosol container, having a passage formed therein through which a flowable product passes;
  a heatable element incorporated within the body in thermal communication with the passage, the heatable element comprising either a magnetically-compatible material or a microwave-compatible material; and
  a heat-retentive material in thermal communication with the heatable element,
  wherein the body is devoid of a field generator.

86. The heat storage unit of claim 85, wherein the heatable element defines a reservoir within the body that is sized to accommodate at least one dose of the flowable product.

87. The heat storage unit of claim 86, wherein the heat-retentive material comprises a sleeve that lines at least a portion of the interior of the reservoir.

88. The heat storage unit of claim 85, wherein the heat-retentive material defines a reservoir within the body that is sized to accommodate at least one dose of the flowable product.

89. The heat storage unit of claim 88, wherein the heatable element comprises a sleeve that lines at least a portion of the exterior of the reservoir.

* * * * *

UNITED STATES PATENT AND TRADEMARK OFFICE
CERTIFICATE OF CORRECTION

| | | |
|---|---|---|
| PATENT NO. | : 7,227,108 B2 | |
| APPLICATION NO. | : 10/875169 | |
| DATED | : June 5, 2007 | |
| INVENTOR(S) | : Brian L. Clothier et al. | |

It is certified that error appears in the above-identified patent and that said Letters Patent is hereby corrected as shown below:

Column 17: Line 46, replace "beatable" with --heatable--

Column 17: Line 48, replace "beatable" with --heatable--

Column 21: Line 43, replace "frirther" with --further--

Signed and Sealed this

Twenty-ninth Day of July, 2008

JON W. DUDAS
*Director of the United States Patent and Trademark Office*